United States Patent
Kaneko et al.

(10) Patent No.: US 8,386,713 B2
(45) Date of Patent: Feb. 26, 2013

(54) MEMORY APPARATUS, MEMORY CONTROL METHOD, AND PROGRAM

(75) Inventors: Nobuhiro Kaneko, Kanagawa (JP); Kenichi Nakanishi, Tokyo (JP)

(73) Assignee: Sony Corporation, Tokyo (JP)

( * ) Notice: Subject to any disclaimer, the term of this patent is extended or adjusted under 35 U.S.C. 154(b) by 829 days.

(21) Appl. No.: 12/207,143

(22) Filed: Sep. 9, 2008

(65) Prior Publication Data
US 2009/0070517 A1   Mar. 12, 2009

(30) Foreign Application Priority Data
Sep. 12, 2007  (JP) ................................. 2007-237181

(51) Int. Cl.
*G06F 12/00* (2006.01)
(52) U.S. Cl. ..................... 711/118; 711/154; 711/203
(58) Field of Classification Search .......................... None
See application file for complete search history.

(56) References Cited

U.S. PATENT DOCUMENTS

| | | | |
|---|---|---|---|
| 5,724,501 A * | 3/1998 | Dewey et al. | 714/5.11 |
| 5,930,167 A * | 7/1999 | Lee et al. | 365/185.03 |
| 6,973,556 B2 * | 12/2005 | Milligan et al. | 711/202 |
| 2005/0015557 A1 * | 1/2005 | Wang et al. | 711/154 |
| 2006/0149902 A1 * | 7/2006 | Yun et al. | 711/118 |
| 2007/0174550 A1 * | 7/2007 | Maeda et al. | 711/118 |
| 2007/0174551 A1 * | 7/2007 | Cornwell et al. | 711/118 |

FOREIGN PATENT DOCUMENTS

| | | |
|---|---|---|
| JP | 11-073363 | 3/1999 |
| JP | 2006-048227 | 2/2006 |
| JP | 2007-156633 | 6/2007 |

* cited by examiner

*Primary Examiner* — Kevin Verbrugge
*Assistant Examiner* — Stella Eun
(74) *Attorney, Agent, or Firm* — SNR Denton US LLP

(57) ABSTRACT

Disclosed herein is a memory apparatus comprising: a non-volatile memory configured to allow data to be written thereto and read therefrom in units of a cluster and to permit data to be deleted therefrom in units of a block made up of a plurality of sectors; a control circuit configured to control access operations to said nonvolatile memory; a management area; a user data area; and a cache area; said management area includes a logical/physical table, and the addresses of physical blocks in said cache area.

13 Claims, 30 Drawing Sheets

FIG.26

| LOGICAL SECTOR ADDRESS 0 |
| LOGICAL SECTOR ADDRESS 1 |
| LOGICAL SECTOR ADDRESS 2× |
| LOGICAL SECTOR ADDRESS 3× |
| ⋮ |
| LOGICAL SECTOR ADDRESS n-1 |
| LOGICAL SECTOR ADDRESS n |

181

| LOGICAL SECTOR ADDRESS 2× |
| LOGICAL SECTOR ADDRESS 3× |
| LOGICAL SECTOR ADDRESS 2× |
| LOGICAL SECTOR ADDRESS 3× |
| ⋮ |
| LOGICAL SECTOR ADDRESS 2 |
| LOGICAL SECTOR ADDRESS 3 |

182

MEMORY APPARATUS, MEMORY CONTROL METHOD, AND PROGRAM

CROSS REFERENCES TO RELATED APPLICATIONS

The present invention contains subject matter related to Japanese Patent Application JP 2007-237181 filed with the Japan Patent Office on Sep. 12, 2007, the entire contents of which being incorporated herein by reference.

BACKGROUND OF THE INVENTION

1. Field of the Invention

The present invention relates to a memory apparatus, a memory control method, and a program. More particularly, the invention relates to a memory apparatus having a nonvolatile memory such as a flash memory, as well as to a memory control method and a program for use with the memory apparatus.

2. Description of the Related Art

There exist varieties of memory apparatuses each containing a flash memory and serving as an external storage device for use with such devices as personal computers, digital still cameras, digital video cameras, and audio recorders. The flash memory is a memory that allows data to be randomly written thereto and read therefrom in clusters. Data is deleted from the flash memory not randomly but in units of a block.

The storage cells in the flash memory deteriorate through repeated data updates. For that reason, the number of update operations on the flash memory is limited. That is, access concentrated on the same clusters is averted so as to prolong the life of the flash memory. When data located at a logical address associated with a given physical address is to be updated, the update data is written not to the same physical block but to another physical block of a newly deleted state (i.e. free block).

The physical address to which the logical address of interest is allocated before a data update is made different from the physical address to which the logical address is allocated after the update. This feature is implemented by the flash memory using an internally stored address translation table that denotes the relations of correspondence between logical and physical addresses. When the memory apparatus is attached to a host device, the address translation table is read from the flash memory, loaded into a working memory of the host device or of the memory apparatus, and updated therein.

In an ordinary memory apparatus, a data update of even a few sectors involves rewriting data in a whole physical block. The access to the block takes time and promotes deterioration of the storage cells therein. In order to minimize the disadvantage, each block in the flash memory is divided into a header area and a data area. The starting address and record length of a data record to be written to a data area are written to the corresponding header area, and the data record in the data area is furnished with a link information area and a flag area. Data is thus written and updated in units of a data record. When the current block becomes exhausted, an effective data record is retrieved and transferred to a free block and the block from which the record was retrieved is deleted. This technique is disclosed illustratively in Japanese Patent Laid-open No. Hei 11-73363 (called the Patent Document 1 hereunder).

SUMMARY OF THE INVENTION

The flash memory formed by blocks each made of the header area and data area as outlined above thus has the header area, link information area, and flag area established for each block. The technique in the Patent Document 1 above tended to reduce the memory capacity to accommodate data and was not conducive to making effective use of the memory.

In order to overcome the flaw of the above-cited technique, this applicant proposed a data processing system disclosed in Japanese Patent Laid-open No. 2006-48227 (called the Patent Document 2 hereunder). This data process system involves providing a logical/physical table in which the addresses of logical blocks, the addresses of physical blocks, and the end cluster numbers of the physical blocks are associated with one another. In operation, if the start cluster number SC for the data to be written based on a write instruction is higher than the end cluster number EC of the physical block in the logical/physical table, then the data is added to a physical block without execution of an ordinary physical block update (i.e., writing of new data to a new physical block and copying of the original physical block).

The data processing system proposed in the Patent Document 2 above reduces the number of times the flash memory is deleted, and updates data efficiently in the flash memory without significantly diminishing the capacity of the flash memory, whereby deterioration of the memory cells is alleviated and access to data in the memory is accelerated.

The above data processing system has a number of characteristics. Data in the memory apparatus of the system that uses a nonvolatile memory as its recording medium cannot be overwritten. Data is written in units different from those in which data is deleted (i.e., the write unit is smaller than the delete unit). Data can be added to within each block of the nonvolatile memory.

A memory apparatus that utilizes a FAT (file Allocation Tables) file system requires updating such management information as FAT and directory entries in parallel with writing file data. A recording device that retains management information has within the memory an area for storing the management information in addition to the data areas for the user. Every time a file data write is performed from the host device, the management information is updated in the flash memory.

A memory apparatus that contains cache blocks retains data in units of a cluster inside each cache block. The correspondence between logical and physical addresses is fixed within the cache block (i.e., logical addresses are allocated in ascending order starting from the beginning of the physical block).

Under these circumstances, the above-mentioned data processing system is required to perform a write-back during a write operation of file data to continuous logical addresses exceeding a designated logical boundary (i.e., a logical space size in units of multiple sectors) even if the update size is smaller than the cluster size. The write-back operation entails block deletes that can shorten the life of the product. The write-back also involves garbage collection and data erasure, which can lead to a drop in write performance.

The management information such as FAT and directory entries is updated in conjunction with the writing of file data. Since the size of the file to be written is smaller than the designated logical boundary constituting the logical space size in units of a plurality of sectors, access is concentrated on the same logical address space. This entails frequent overwriting of data.

For these reasons, the above-cited data processing system is constrained to perform a write-back operation whenever data is written to the logical space that was once written to a cache block. The write-back triggers block deletes that shorten the life of the product. The write-back also involves garbage collection and data erasure, which can lead to a drop in write performance.

Because data in the nonvolatile memory (NAND type flash memory) cannot be overwritten and because data is deleted in units of a block, the logical/physical table must be kept consistent inside the memory apparatus whenever a data update takes place. This means that the write data needs to be saved elsewhere in units of a block regardless of the size of the data to be updated.

Furthermore, data other than the update data needs to be copied through garbage collection of the data from the original block. After the update, there emerges a block which contains unnecessary data and which needs to be deleted. In this connection, the allowable number of times each block can be deleted is limited.

This applicant then proposed a memory apparatus and a memory control method (in Japanese Patent Laid-open No. 2007-156633, called the Patent Document 3 hereunder) intended to overcome the drawbacks outlined above. The proposed apparatus and method were designed to suppress write-back operations thereby preventing garbage collection and data erasure and minimizing the decrease in write performance. Still, the proposed apparatus and method had the following drawbacks:

According to the above-cited technique, if written data has stopped short of a designated logical boundary, then the data is saved into a cache block called the OD-cache. Management information is registered in a manner allowing the beginning and the end of a logical space (logical space A) to be identified in the OD-cache. Because only one logical space can be registered, if a write to a different logical space B takes place in the same block, a write-back must be carried out. Although this problem can be bypassed by enlarging the size of the management information, it takes longer to save the bloated management information, and the process of saving the management information needs to be carried out more often. This leads to a drop in write performance when write-back operations do not take place.

The present invention has been made in view of the above circumstances and provides a memory apparatus, a memory control method, and a program for reducing the frequency of write-back operations unfailingly, thereby preventing a drop in write performance when write-back operations do not occur.

In carrying out the present invention and according to one embodiment thereof, there is provided a memory apparatus including: a nonvolatile memory configured to allow data to be written thereto and read therefrom in units of a cluster and to permit data to be deleted therefrom in units of a block made up of a plurality of sectors; and a control circuit configured to control access operations to the nonvolatile memory; wherein the nonvolatile memory includes: a management area in which to record management information; a user data area in which to record data from a user; and a cache area in which to hold temporarily data to be written and read to and from the user data area; wherein the management area includes a logical/physical table which stores the addresses of logical blocks in the user data area in association with the addresses of physical blocks allocated to the logical blocks, and the addresses of physical blocks in the cache area which correspond to the addresses of the physical blocks in the logical/physical table; and wherein, upon writing of data of which the size is smaller than a designated logical size constituting a logical space size in units of a plurality of sectors in a user block in the user data area, the control circuit saves the data into a suitably selected cache block while writing part of management information into the cache block which retains the data.

Preferably, the control circuit may save the data in a plurality of logical spaces in the cache block while maintaining the size in the nonvolatile memory for saving the management information.

Preferably, the control circuit may determine whether or not additional data can be written to the selected cache block in view of the management information in the cache block and, if it is found possible to write additional data to the cache block, then write additional management information to the cache block before adding the write data thereto.

Preferably, if it is found possible to write additional data to the cache block, then the control circuit may update the management information in the management area before writing additional management information to the cache block and adding the write data thereto.

Preferably, the control circuit may determine whether or not additional data can be written to the selected cache block and, if it is not found possible to write additional data to the cache block, then determine whether or not the number of a plurality of logical spaces registered in the cache block is larger than a predetermined number; and wherein, if the number of the plurality of logical spaces is found smaller than the predetermined number, then the control circuit may copy effective data saved in the cache block to a new cache block, and add management information about status following the copy to the new cache block.

Preferably, if there exist a plurality of items of management information in the cache block, then the control circuit may make the most recently written item of management information effective.

Preferably, the control circuit may write additional management information to the new cache block before adding the write data thereto.

According to another embodiment of the present invention, there is provided a memory control method for use with a nonvolatile memory configured to allow data to be written thereto and read therefrom in units of a cluster and to permit data to be deleted therefrom in units of a block made up of a plurality of sectors, the nonvolatile memory including a management area, a user data area and a cache area, the memory control method including the steps of: recording a logical/physical table which stores the addresses of logical blocks in the user data area in association with the addresses of physical blocks allocated to the logical blocks, and the addresses of physical blocks in the cache area which correspond to the addresses of the physical blocks in the logical/physical table; and upon writing of data of which the size is smaller than a designated logical size constituting a logical space size in units of a plurality of sectors in a user block in the user data area, saving the data into a suitably selected cache block while writing part of management information into the cache block which retains the data.

According to a further embodiment of the present invention, there is provided a program for causing a computer to execute a memory control process on a nonvolatile memory configured to allow data to be written thereto and read therefrom in units of a cluster and to permit data to be deleted therefrom in units of a block made up of a plurality of sectors, the nonvolatile memory including a management area, a user data area and a cache area, the memory control process including the steps of: recording a logical/physical table which stores the addresses of logical blocks in the user data area in association with the addresses of physical blocks allocated to the logical blocks, and the addresses of physical blocks in the cache area which correspond to the addresses of the physical blocks in the logical/physical table; and upon writing of data of which the size is smaller than a designated logical size constituting a logical space size in units of a plurality of sectors in a user block in the user data area, saving the data into a suitably selected cache block while writing part of management information into the cache block which retains the data.

Where the present invention is embodied as outlined above, part of management information is saved in a predetermined cache block. That is, part of management is stored into the block in which user data is saved. This makes it possible to hold a plurality of logical spaces in the cache block while keeping intact the size for saving management data in the nonvolatile memory, whereby the number of times a write-back operation takes place is reduced.

According to the present invention, as outlined above, the frequency of write-back operations is lowered unfailingly. This in turn prevents a drop in write performance while the write-back is being suppressed.

BRIEF DESCRIPTION OF THE DRAWINGS

FIG. 26 is a schematic view showing the state of a cache block and that of a user data block before writing in step S41;

BRIEF DESCRIPTION OF THE PREFERRED EMBODIMENTS

Figure 1:
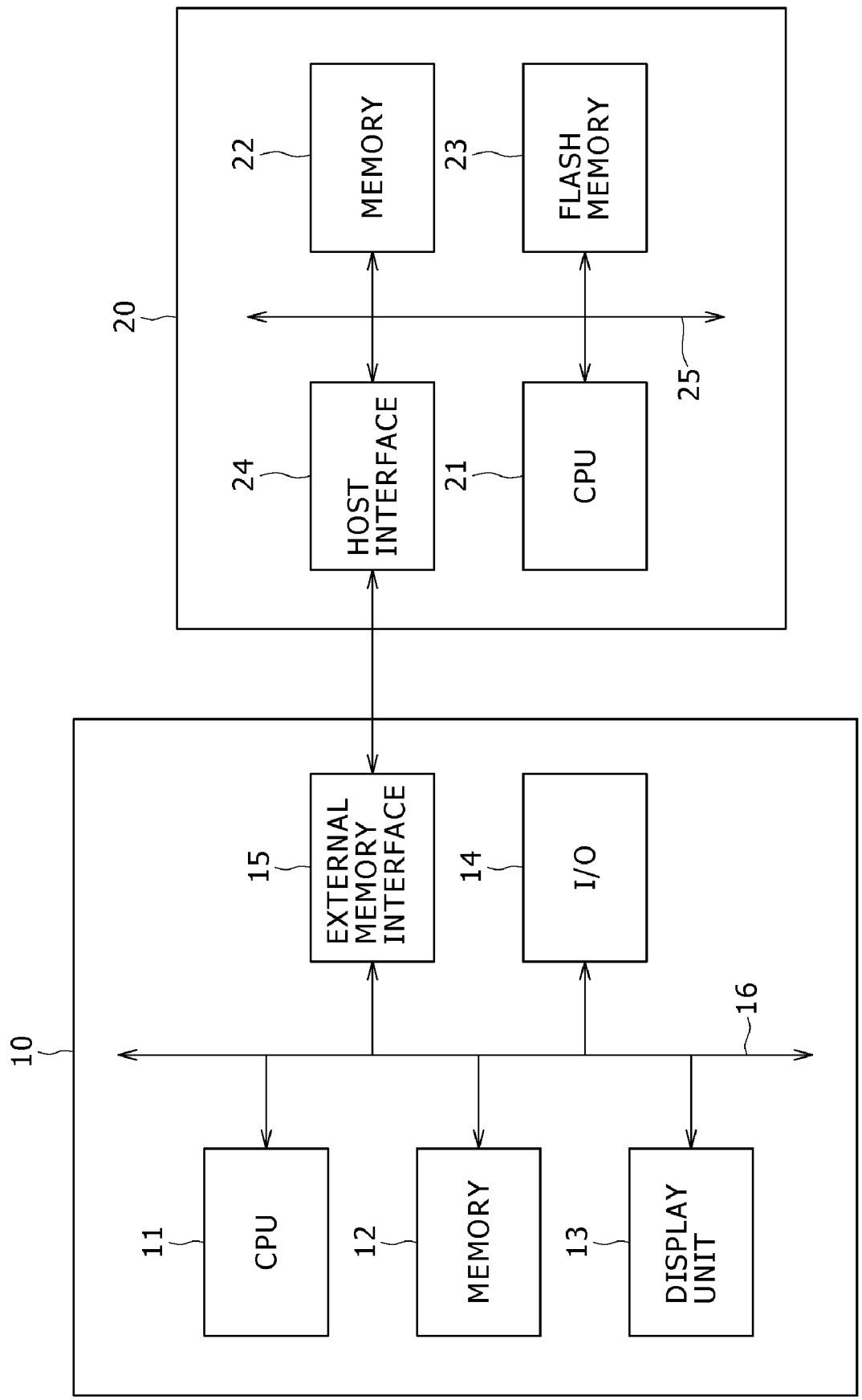
FIG. 1 is a schematic view outlining a typical configuration of a data processing system embodying the present invention.

The preferred embodiments of the present invention will now be described in reference to the accompanying drawings. FIG. 1 is a schematic view outlining a typical configuration of a data processing system embodying the present invention.

As shown in FIG. 1, the data processing system is made up of two major components: a host device 10, and a memory card 20 that can be removably attached to the host device 10. In this embodiment, the memory card 20 includes a flash memory that is a nonvolatile memory.

The host device 10 is typically constituted by such equipment as a personal computer, a digital still camera, a digital video camera, or an audio recorder. The host device 10 includes a CPU 11, a memory 12, a display unit 13, an input/output (I/O) section 14, and an external memory interface 15.

The CPU 11 is connected with the memory 12, display unit 13, I/O section 14, and external memory interface 15 by way of a bus 16. The memory 12 has a ROM for storing programs and a RAM acting as a working memory. The external memory interface 15 sends and receives data to and from the memory card 20 according to control instructions from the CPU 11.

The memory card 20 includes a CPU 21, a memory 22, a flash memory 23, and a host interface 24.

The CPU 21 is connected with the memory 22, flash memory 23, and host interface 24 through a bus 25. The memory 22 has a ROM for storing programs and a RAM acting as a working memory. The flash memory 23 is typically a NOR or NAND type flash memory (nonvolatile memory). The host interface 24 sends and receives data to and from the host device 10 according to control instructions from the CPU 21.

Figure 2:
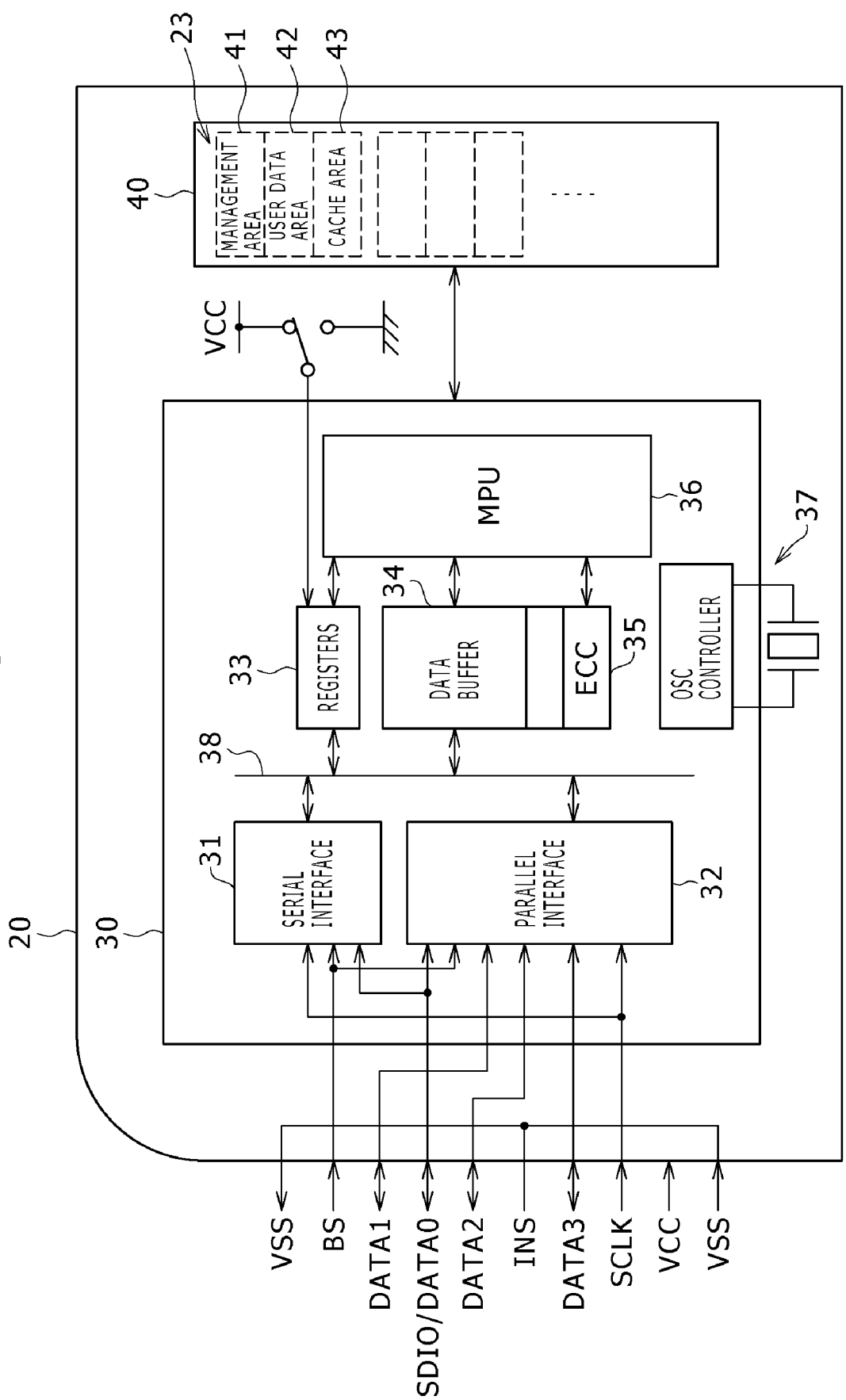
FIG. 2 is a block diagram showing a typical structure of a memory card.

FIG. 2 is a block diagram showing a typical structure of the memory card 20 in FIG. 1. As shown in FIG. 2, the memory card 20 is illustratively a board-like Memory Stick (registered trademark). When the memory card 20 is attached to the host device 10, the data supplied by the host device 10 is written to the memory card 20. The memory card 20 has a controller section 30 and a memory section 40. The memory section 40 includes a plurality of flash memories 23, and access to the flash memories 23 is controlled by the controller section 30.

The control section 30 includes a serial interface 31, a parallel interface 32, registers 33, a data buffer 34, an error-correcting circuit (ECC) 35, a micro processing unit (MPU) 36, and a clock signal generator 37. The serial interface 31, parallel interface 32, registers 33, data buffer 34, and ECC 35 are interconnected with one another via a bus 38. The registers 33, data buffer 34 and ECC 35 are connected to the MPU 36.

The registers 33 include an instruction register and other registers. The data buffer 34 temporarily holds the data being accessed in connection with the flash memories 23. The ECC 35 performs an error-correcting process on the data held in the data buffer 34. The clock signal generator 37 generates a clock signal for use inside the Memory Stick.

The data output by the host apparatus 10 is input to either or both of the serial interface 31 and parallel interface 32 through signal lines DATA0 through DATA3. From there, the data is transferred to the data buffer 34. The data in the data buffer 34 is written to the flash memories 23 by the MPU 36.

The memory card 20 is supplied with a reference voltage and a source voltage via signal lines VSS and VCC. The memory card 20 is also furnished with other signal lines: a signal line SCLK through which to input a clock signal necessary for importing data from the host device 10; a signal line INS for checking to determine whether or not the memory card 20 is normally attached to the host device 10; and a signal line BS for determining the direction of the data supplied from the host device 10.

What follows is an outline of a write operation performed by the data processing system. The host device 10 first sends a write command and a write data address, followed by write data, to the memory card 20. Each flash memory 23 has data written thereto and read therefrom in units of a sector, whereas the host device 20 writes and reads data in units of a cluster. The write data received by the memory card 20 is thus placed in the data buffer 34. When reception of the write data is completed, the write data held in the data buffer 34 is written to the flash memories 23.

A read operation carried out by the data processing system is outlined below. The host device 10 first sends a read command and a read data address to the memory card 20. Upon receipt of the command and address, the data in question is read from the flash memory 23 and placed into the data buffer 34. When reading of the data in question from the flash memory 23 is completed, the read data held in the data buffer 34 is sent from there to the host device 10.

Figure 3:
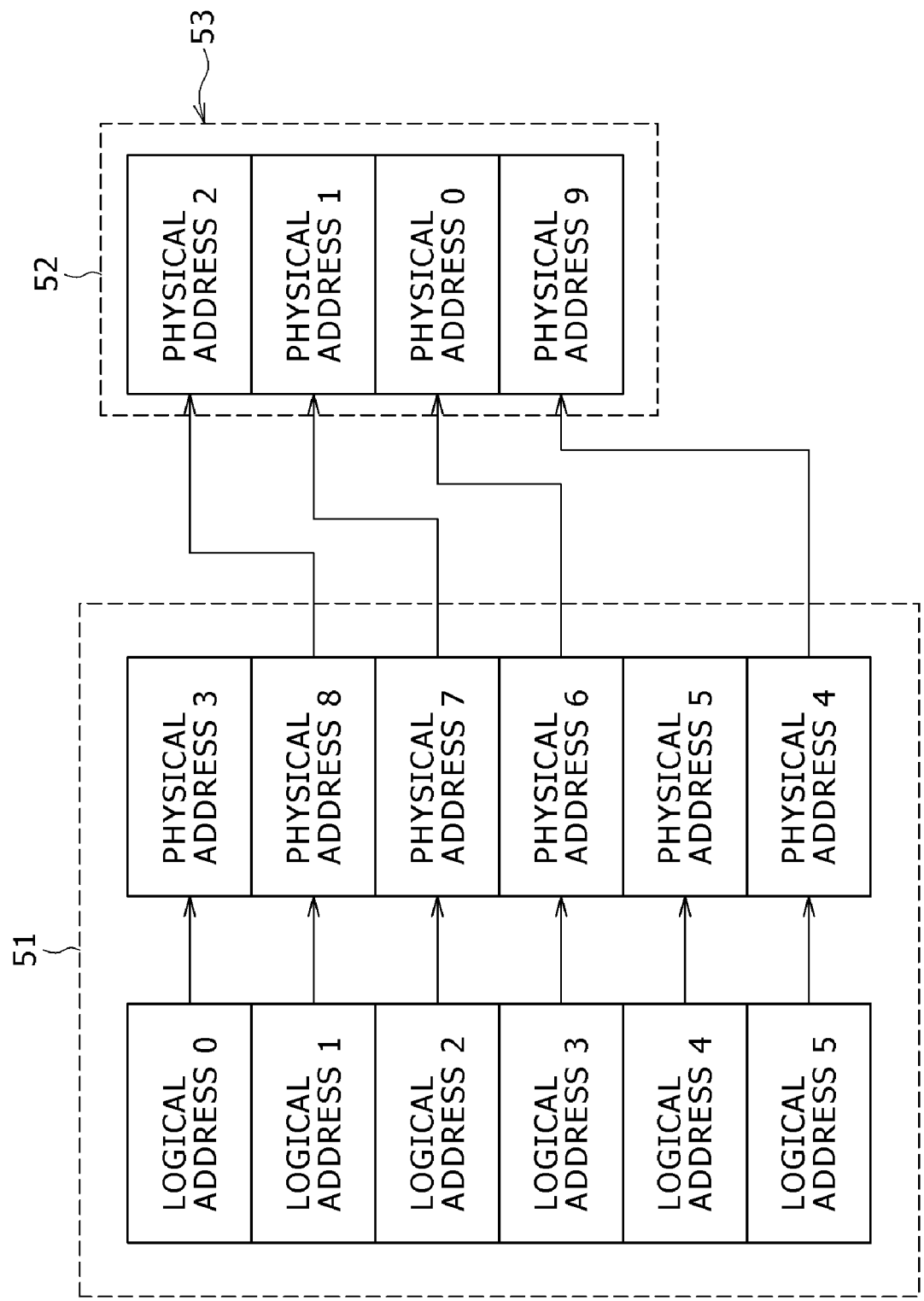
FIG. 3 is a schematic view showing typical relations of correspondence between user data blocks and cache blocks.

The memory control method embodying the present invention is outlined below. FIG. 3 is a schematic view showing typical relations of correspondence between user data blocks and a cache block. In FIG. 3, reference numeral 51 stands for a logical/physical table, and reference numeral 52 denotes the cache block.

The flash memories 23 shown in FIGS. 1 and 2 hold a logical/physical table 51 that denotes the relations of correspondence between physical and logical addresses of user data blocks indicated in FIG. 3. In the logical/physical table 51, addresses 0, 1, 2, 3, 4 and 5 of logical blocks are associated illustratively with addresses 3, 8, 7. 6, 5 and 4 of the physical blocks allocated to the logical blocks. When the memory card 20 is attached to the host device 20, the logical/physical table 51 is read by the controller section 30 from the flash memories 23 and updated thereby in keeping with data write operations.

Each of the physical block addresses 3, 8, 7, 6, 5 and 4 in the logical/physical table 51 is associated with one of the physical addresses 2, 1, 0 and 9 in the cache block 52. The physical addresses 2, 1, 0 and 9 in the cache block are arranged in ascending order of use frequency, as indicated by reference numeral 53.

For example, it is assumed that the physical block addresses 8, 7, 6 and 4 denote the addresses of physical blocks in a free area. In that case, the physical addresses 2, 1, 0 and 9 in a new cache block 52 of a free block (i.e., data-free cache area) are allocated to the physical block addresses 8, 7, 6 and 4 respectively. In the new cache block 52 in the cache area, the physical addresses 2, 1, 0 and 9 are arranged in ascending order of relative use frequency. This makes it possible for data to be written starting from the beginning of the cache block 52.

What follows is a description of the preconditions for the memory control method embodying the present invention. The major terms to be used in the ensuing description are defined below.

A plurality of flash memories 23 in the memory apparatus such as the memory card 20 in FIG. 2 include a management area 41, a user data area 42, and a cache area 43 each. Blocks in the user data area 42 are called user data blocks and those in the cache area 43 are called cache blocks. The cache blocks are equal to the user blocks in size. When the logical space of each cache block is divided into user blocks, each division has the size called a logical block size. When the logical space of each user block is divided into a plurality of sectors, each division has the size called a logical page size (also called a designated logical boundary). A block from which data has been deleted is called a free block. A new cache block is acquired from such a free block.

A write-back operation involves writing data held in a cache block back to a user data block, whereby the use of the cache block is discontinued. This makes it necessary to merge the data in the user data block with the data in the cache block. The merge triggers a copy operation. Following the merge, the block that has become unnecessary needs to be deleted. There also is an operation called garbage collection. This is a copy operation necessary for performing the write-back.

What follows is a description of cache blocks. There are two kinds of cache blocks: AD-cache and OD-cache. The total number of available cache blocks is fixed. The number of AD-caches and that of OD-caches vary with the write operations performed by the host device.

The AD-cache is a cache block intended to hold file data. Either an OD-cache or an AD-cache is recognized depending on the write size. An AD-cache is recognized if the designated logical boundary (logical page size) is exceeded when a write operation is performed following acquisition of a new cache block.

Depending on the logical address to which data is first written, the subsequent logical addresses to which to write data in the AD-cache are restricted. If the logical address space where data is first written is inside a given logical block size space (A) and if the logical address to which to write data next is within the logical space (A) and outside the written logical space of the cache block, then it is possible to write data to this cache block.

The OD-cache is a cache block intended to hold management information such as FAT and directory entries. Either an OD-cache or an AD-cache is recognized depending on the write size. An OD-cache is recognized if the designated logical boundary (logical page size) is not exceeded when a write operation is performed following acquisition of a new cache block.

Depending on the logical address to which data is first written, the subsequent logical addresses to which to write data in the OD-cache are restricted. If the logical address space where data is first written is inside a given logical block size space (B) and if the logical address to which to write data next is within the logical space (B), then it is possible to write data to this cache block.

Cache block-related information is explained below as part of the management information. The management information includes information indicating the frequency of cache block updates, information denoting the logical block to which the cache block corresponds, and information about the first logical address in the cache block.

Address information about the written sectors in the cache block is not included in the management information, the written sector addresses are acquired by reading inside the cache block. Information indicating whether the cache block of interest is a AD-cache or an OD-cache is also included in the management information.

Specific operations of the memory control method will now be described. FIGS. 4 through 8 are flowcharts indicating the write process. FIGS. 4 through 8 outline the steps performed by the CPU 21 for writing data to the flash memory 23.

Figure 4:
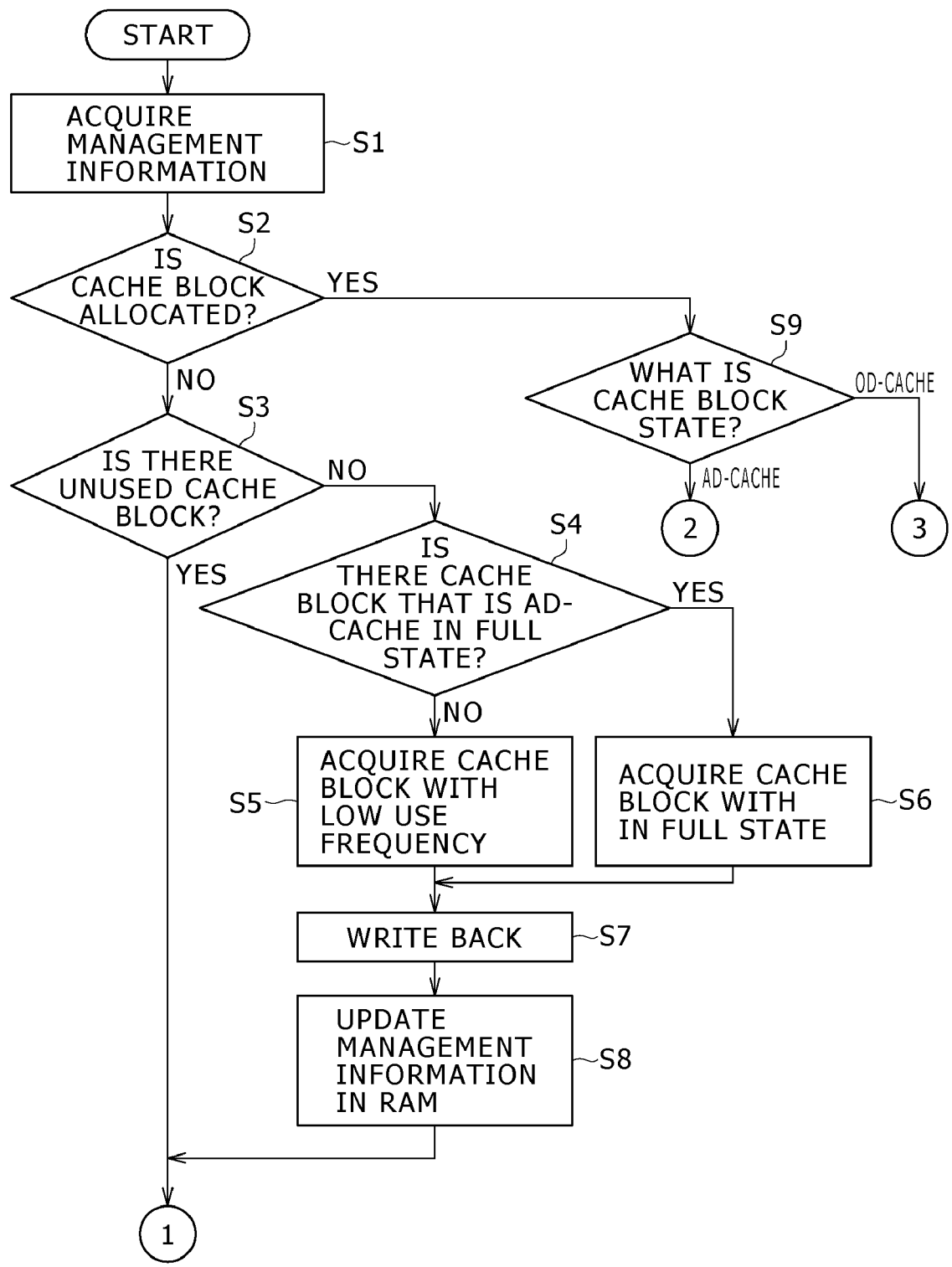
FIG. 4 is a flowchart of steps making up a write process.

In step S1 of FIG. 4, the CPU 21 acquires address information and written logical space information about user data blocks in the user data area 42 from the management information in the management area 41. The CPU 21 also acquires address information and written logical space information about cache blocks in the cache area 43, the address information corresponding to the logical addresses of the user data blocks in the user data area 42. The CPU 21 further acquires address information about new cache blocks (free blocks) in the cache area 43.

In step S2, the CPU 21 checks to determine whether or not there is any allocated cache block in the cache blocks being used. What is carried out in step S2 is to search for a cache block such as one of those shown in FIGS. 9A and 9B.

Figure 9A:
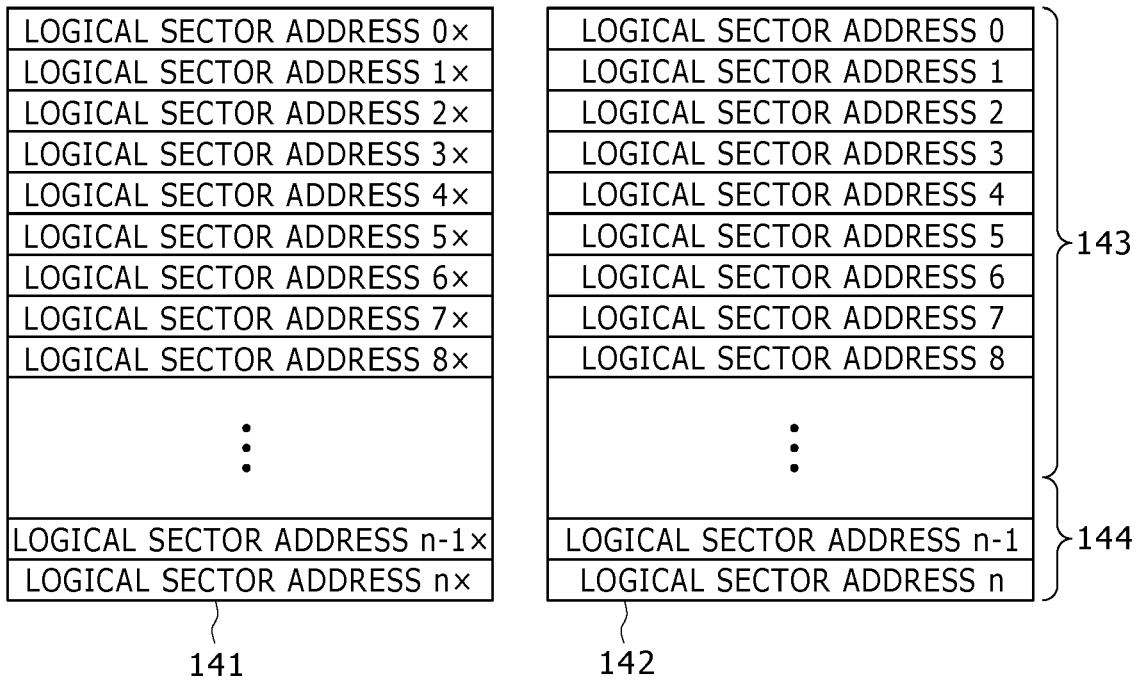
FIGS. 9A and 9B are schematic views each showing a cache block (AD-cache) in the full state with data written from a host (in 2 patterns)
Figure 9B:
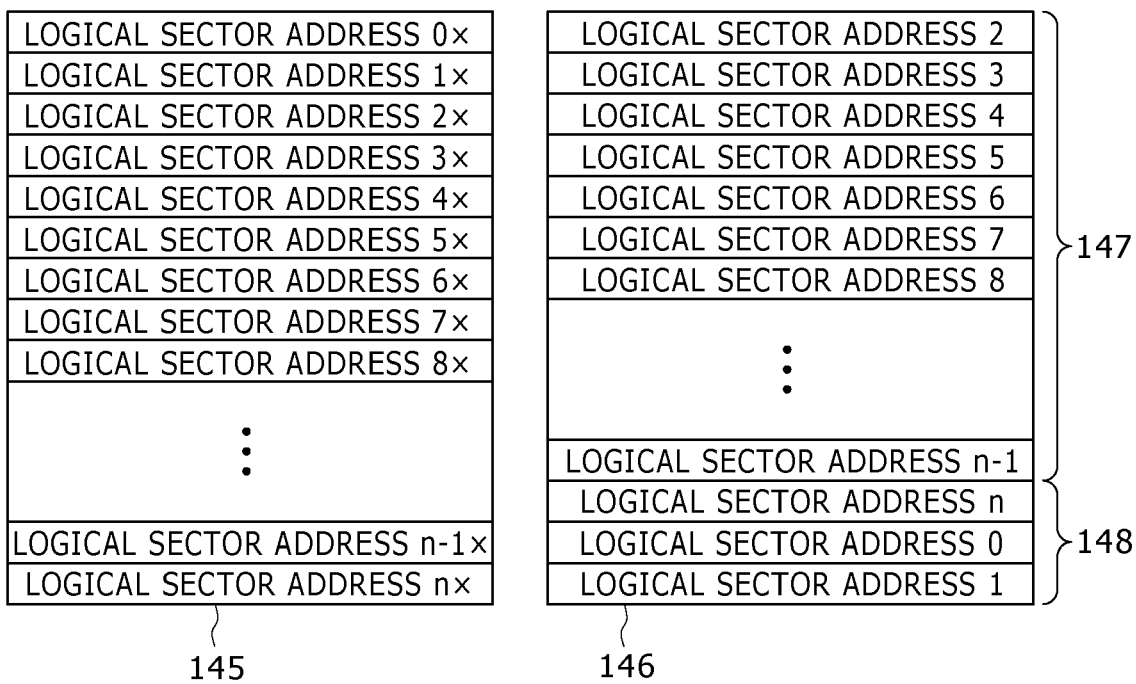

FIGS. 9A and 9B are schematic views each showing a cache block (AD-cache) in the full state with data written from the host device (in 2 patterns).

FIG. 9A shows a cache block (AD-cache) 142, in pattern 1, having logical sector addresses 0 through "n" which correspond to a user data block 141 and which are filled with written data 143 and with data 144 written from the host device.

FIG. 9B shows a cache block (AD-cache) 146, in pattern 2, having logical sector addresses 2 through "n," 0 and 1 which correspond to a user data block 145 and which are filled with written data 147 and with data 148 written from the host device.

In any of the cache block states in FIGS. 9A and 9B, no further data can be written to the cache block. Since there is no point in having such a cache block, a write-back operation is carried out preferentially on that cache block. If none of the states in FIGS. 9A and 9B applies, then a write-back operation is performed preferentially on a cache block with low use frequency.

Figure 5:
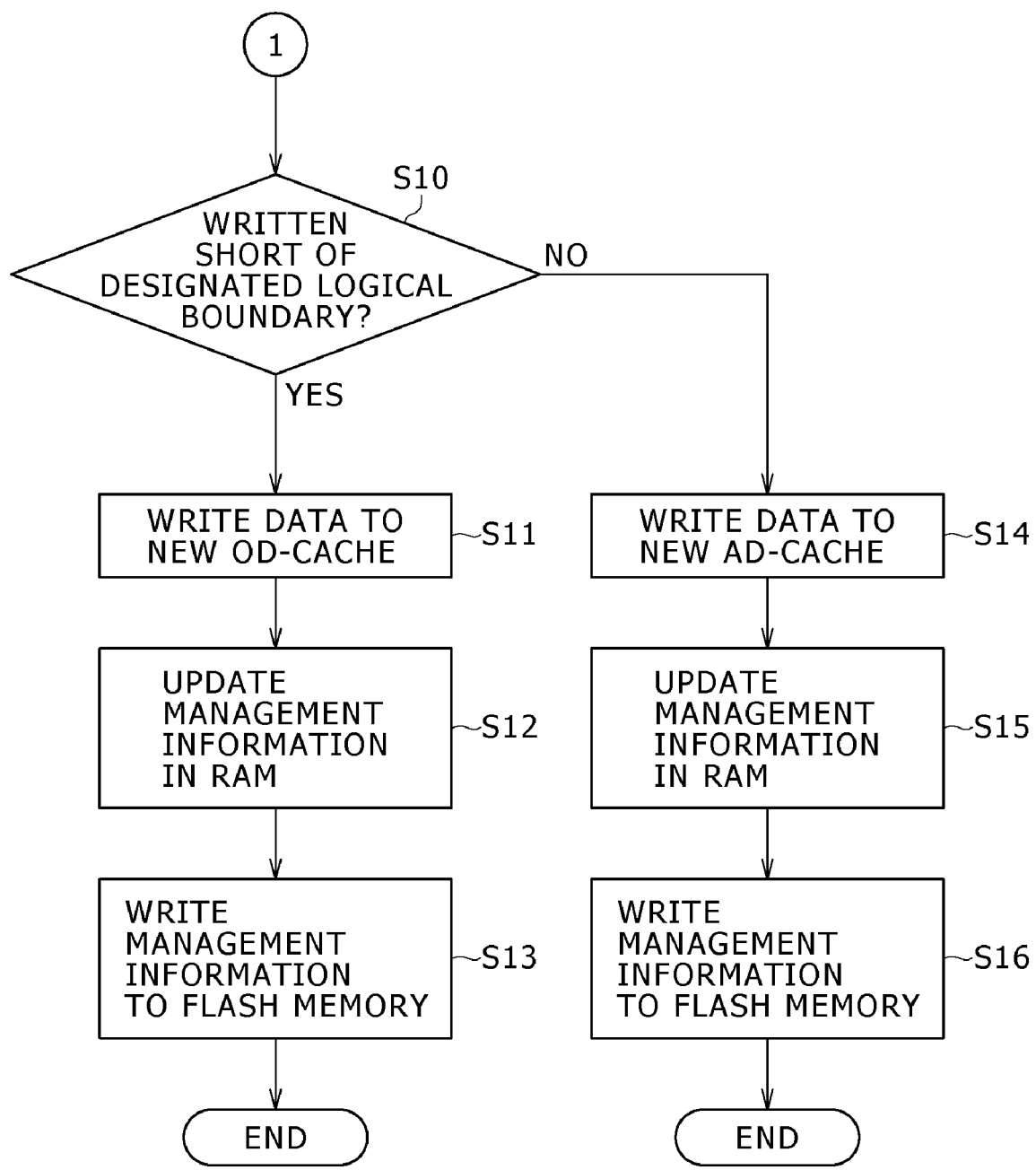
FIG. 5 is a flowchart of other steps making up the write process.

If in step S2 an allocated cache block is not found to exist, then step S3 is reached. In step S3, the CPU 21 checks to determine if there is any unused cache block. If in step S3 an unused cache block is found to exist, then step S10 and subsequent steps in FIG. 5 are reached and carried out. If in step S3 an unused cache block is not found to exist, then step S4 is reached. In step S4, the CPU 21 checks to determine whether or not there is a cache block (AD-cache) in the full state.

If in step S4 a cache block (AD-cache) in the full state is not found to exist, then step S5 is reached. In step S5, the CPU 21 acquires a cache block with low use frequency. In step S7, the CPU 21 carries out a write-back whereby the acquired cache block with low use frequency is reallocated to the logical sector addresses in the user data block. In step S8, the CPU 21 updates the management information in the memory 22 and goes to step S10 and subsequent steps in FIG. 5.

If in step S4 a cache block (AD-cache) in the full state is found to exist, then step S6 is reached. In step S6, the CPU 21 acquires the cache block in the full state before reaching step S7.

Figure 6:
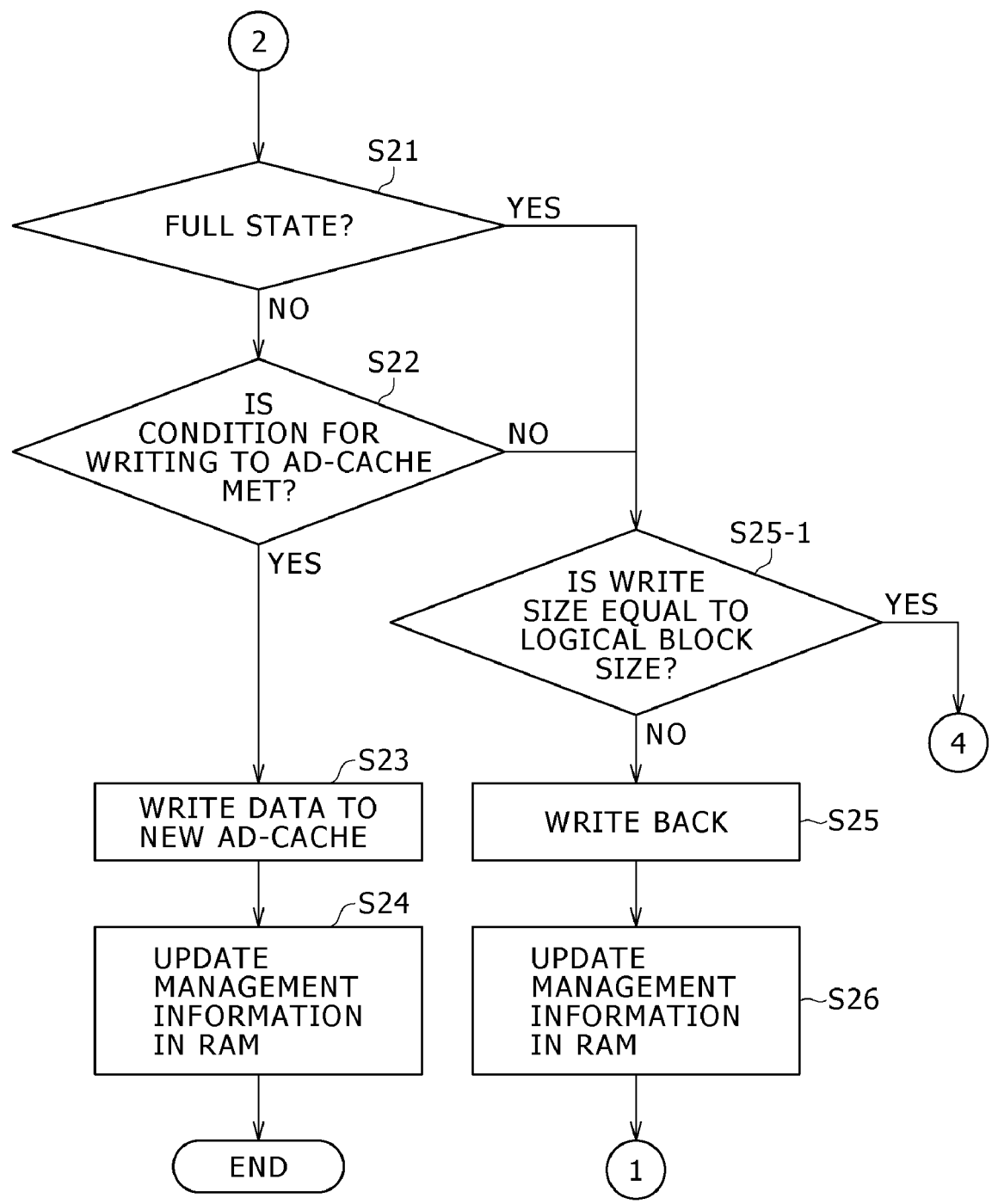
FIG. 6 is a flowchart of other steps making up the write process.
Figure 7:
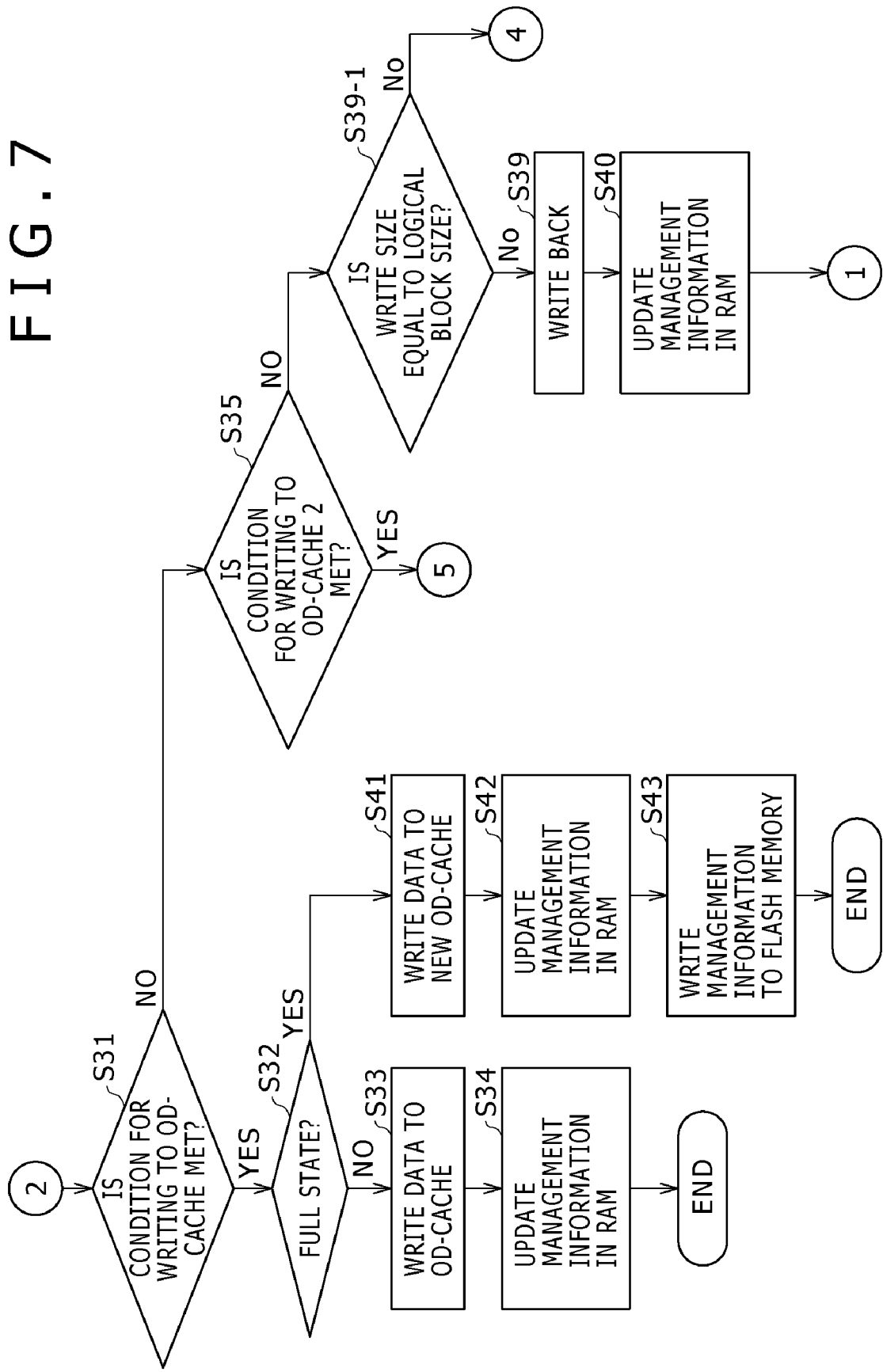
FIG. 7 is a flowchart of other steps making up the write process.
Figure 8:
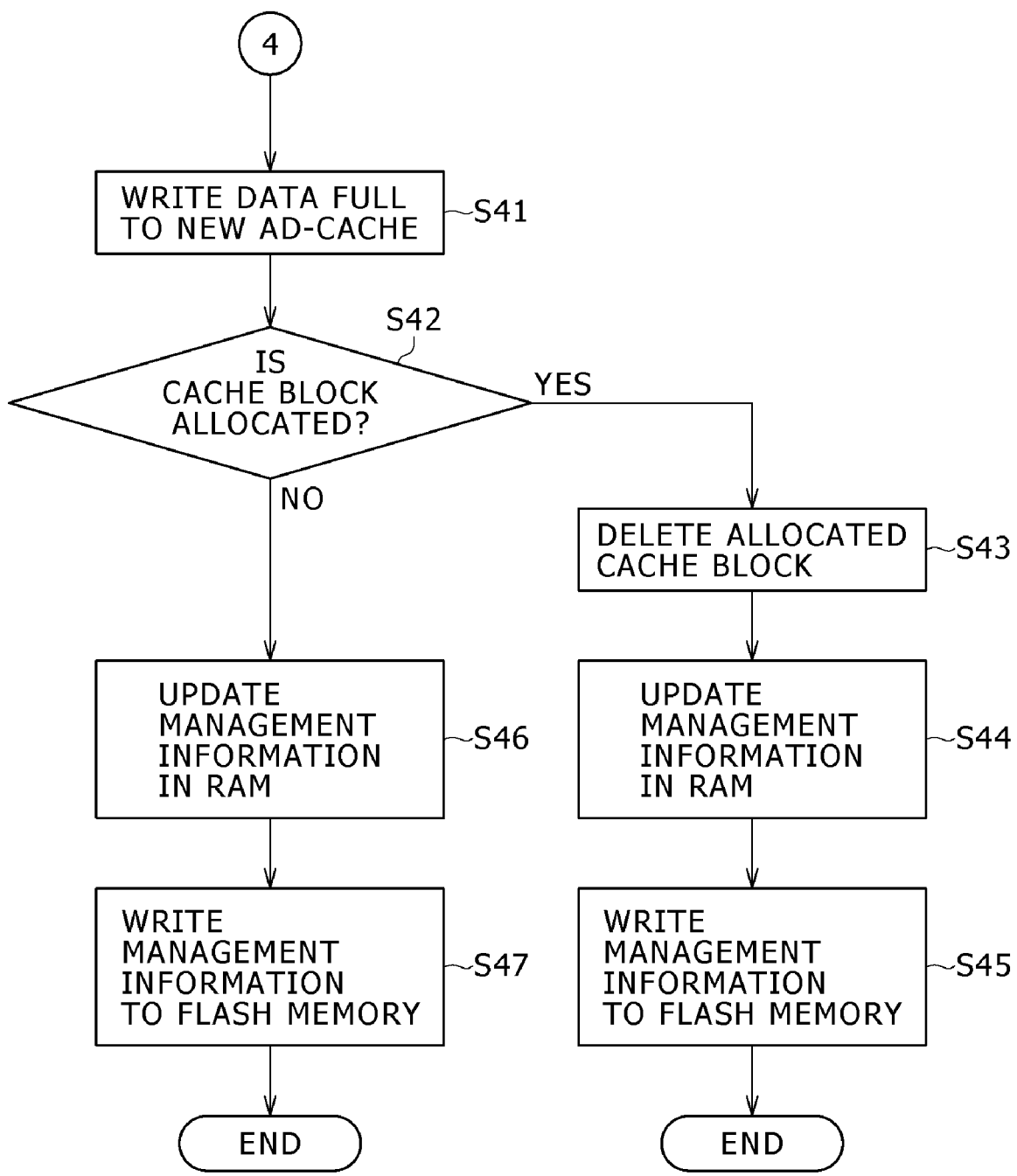
FIG. 8 is a flowchart of other steps making up the write process.

If in step S2 an allocated cache block is found to exist, then step S9 is reached. In step S9, the CPU 21 checks to determine whether or not the cache block in question is an AD-cache or an OD-cache. If in step S9 the cache block in question is found to be an AD-cache, then step S21 and subsequent steps in FIG. 6 are reached and carried out. If the cache block is found to be an OD-cache in step S9, then step S31 and subsequent steps in FIG. 7 are reached and carried out.

In step S10 of FIG. 5, the CPU 21 checks to determine whether written data has stopped short of the designated logical boundary. If in step S10 written data is found to have exceeded the designated logical boundary, then step S14 is reached. In step S14, the CPU 21 writes data to a new cache block (AD-cache). The use of a new cache block (AD-cache) in step S14 allows data to be written without triggering a write-back operation. In step S14, data is written starting from the beginning of the cache block regardless of logical addresses.

Figure 10:
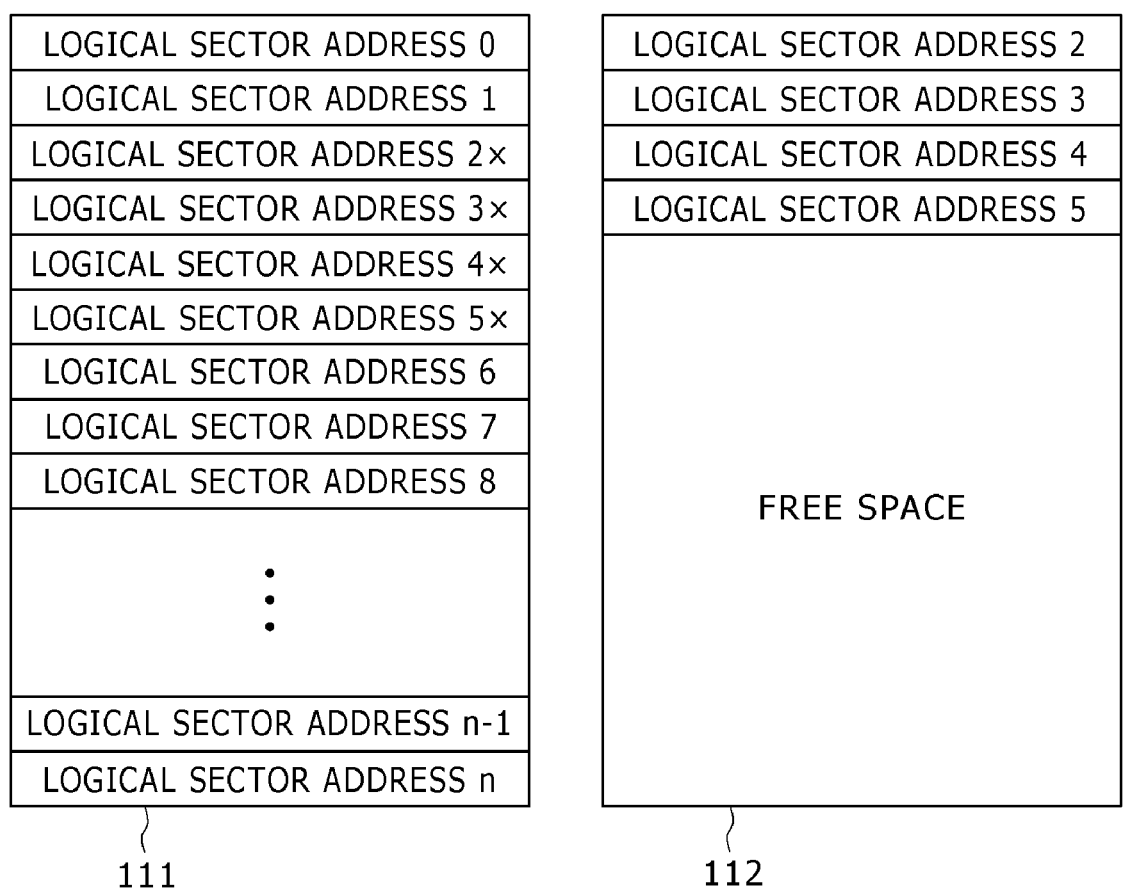
FIG. 10 is a schematic view showing the state of a cache block and that of a user data block upon writing in step S14.

FIG. 10 is a schematic view showing the state of a cache block and that of a user data block upon writing in step S14. It is assumed that in FIG. 10, data is written illustratively to logical sector addresses 2 through 5 in a user data block 111. With the data thus written, logical sector addresses 2 through 5 are written in a cache block 112 starting from the beginning of the block, and the rest of the cache block is left blank.

After the write operation in step S14, step S15 is reached. In step S15, the CPU 21 updates the management information in the memory 22 because the cache block 112 has been newly allocated to the user data block 111. In step S16, the CPU 21 writes the management information to the management area 41.

In step S21 of FIG. 6, the CPU 21 checks to determine whether or not the cache block (AD-cache) has its written area alone in the full state. If in step S21 the cache block (AD-cache) is not found to have its written area only in the full state, then step S22 is reached. In step S22, the CPU 21 checks to determine whether or not the condition for writing to the cache block (AD-cache) is met.

If in step S22 the condition for writing to the cache block (AD-cache) is found to be met, then step S23 is reached. In step S23, the CPU 21 performs a write operation on the cache block (AD-cache). In step S24, the CPU 21 updates the management information in the memory 22.

Figure 11:
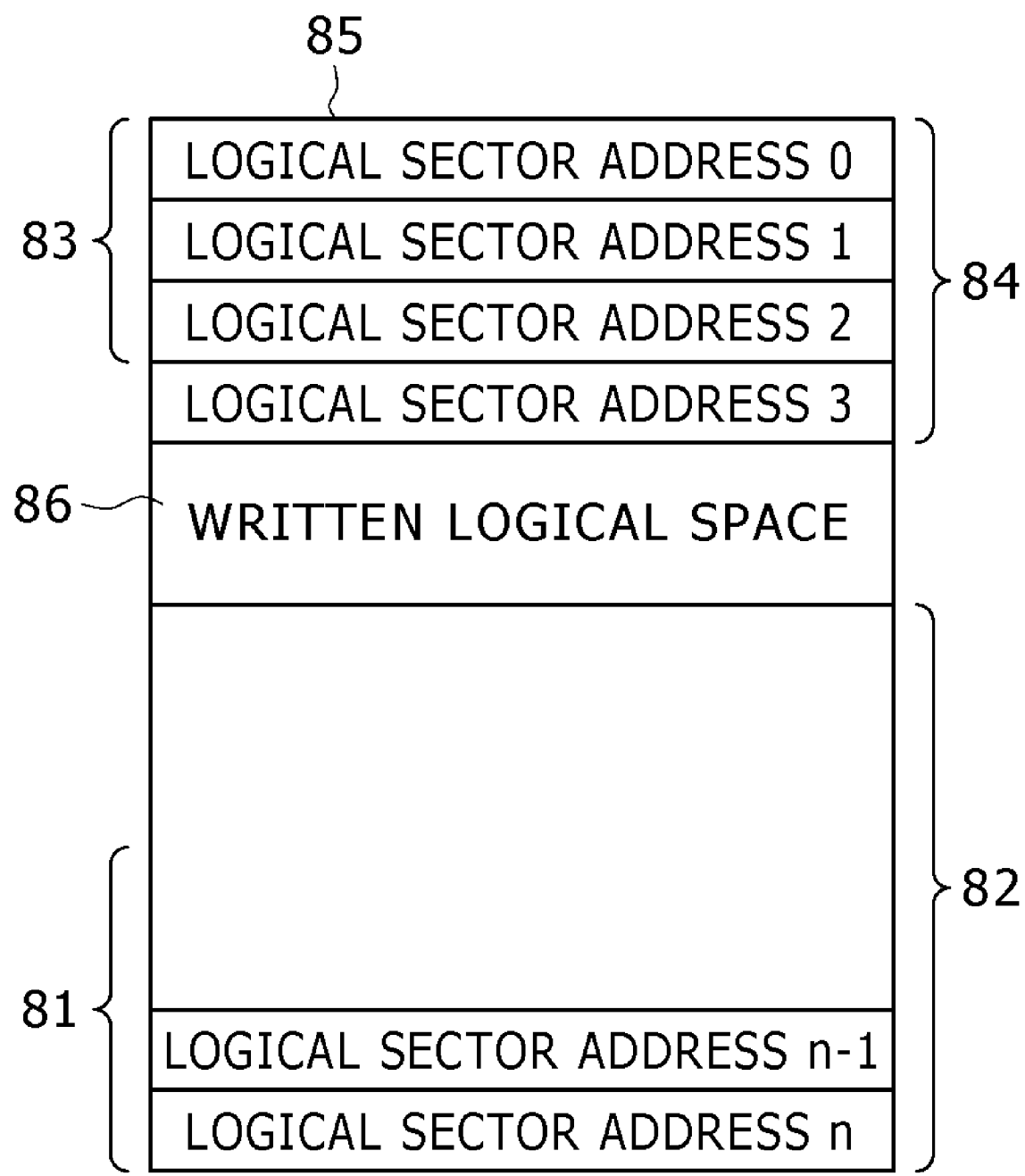
FIG. 11 is a schematic view showing typical write patterns meeting the condition for writing in step S25.

What is carried out in step S22 is to determine whether or not the logical space to which data is about to be written applies to one of logical spaces 81 through 84 which are shown in FIG. 11 and which are located differently relative to the written logical space in the cache block.

FIG. 11 is a schematic view showing typical write patterns meeting the condition for writing in step S22. In FIG. 11, reference numeral 81 denotes the case where data starts to be written after the written sectors in a written space 86; reference numeral 82 stands for the case where data starts to be written immediately after the written sectors in the written space 86; reference numeral 83 represents the case where data written from the host device has stopped short of the written sectors in the written space 86; and reference numeral 84 indicates the case where data written from the host has stopped immediately before the written sectors in the written space 86.

What is carried out in step S23 is to write data to the allocated cache block without recourse to a write-back operation. In step S23, data starts to be written immediately after the written sectors inside the cache block. If it is impossible to start writing data immediately after the written sectors, then a data area up to the write start sector address is copied.

Figure 12:
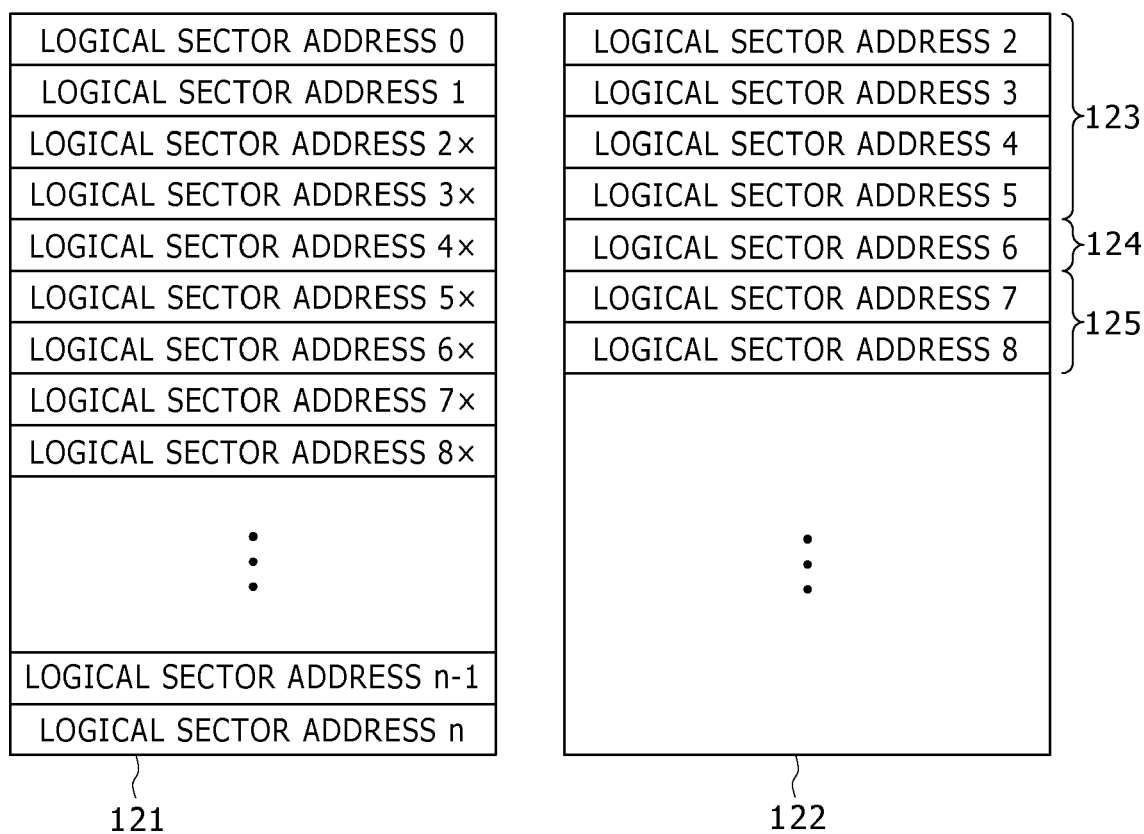
FIG. 12 is a schematic view showing the state of a cache block and that of a user data block upon writing in step S23.

FIG. 12 is a schematic view showing the state of a cache block and that of a user data block upon writing in step S23. Illustratively, suppose that with the state of FIG. 10 in effect, a write operation takes place on logical sector addresses 7 and 8 in a user data block 121. In that case, with the write operation completed, data 123 written to logical sector addresses 2 through 5 in a cache block 122 is followed by data 124 copied to logical sector address 6 from the user data block 121. Subsequent to the data 124 is data 125 written to logical sector addresses 7 and 8 from the host device.

After the writing in step S23, there is no block address change in the cache block. This does not entail any write operation to the management area 41 to save the management information; only the management information in the memory 22 is updated in step S24. If in step S21 the cache block (AD-cache) is found to have its written area alone in the full state, or if in step S22 the condition for writing to the cache block (AD-cache) is not found to be met, then step S25-1 is reached. In step S25-1, the CPU 21 checks to determine whether or not the write size is equal to the logical block size. If in step S25-1 the write size is not found equal to the logical block size, then step S25 is reached and the CPU 21 performs a write-back operation. In step S26, the CPU 21 updates the management information in the memory 22.

What takes place in step S25 is that with the write operation carried out, a write-back operation is performed without triggering garbage collection provided the cache block (AD-cache) is in one of the full states shown in FIGS. 9A and 9B. At this point, the cache block is registered in the management block as a user data block. The user data block in effect before the write-back is deleted of its content and the resulting user data block is registered as a free block in the management information.

Even if the cache block (AD-cache) is not found to be in the full state, garbage collection may be carried out in step S25 to put the cache block in the full state. If in step S25-1 the write size is found equal to the logical block size, then data is written full to a new cache block (AD-cache) in step S41 of FIG. 8. In step S42, the CPU 21 checks to determine whether or not the cache block (AD-cache) is allocated.

If in step S42 the cache block (AD-cache) is found to be allocated, then step S43 is reached. In step S43, the CPU 21 deletes the allocated cache block (AD-cache). After the cache block (AD-cache) is deleted in step S43, the CPU 21 goes to step S44 and updates the management information in the memory 22 because the cache block 112 allocated to the user data block 111 has been deleted. In step S45, the CPU 21 writes the management information to the management area 41.

If in step S42 the cache block (AD-cache) is not found to be allocated, then step S46 is reached. In step S46, the CPU 21 updates the management information in the memory 22 because the unallocated cache block 112 exists with regard to the user data block 111. In step S47, the CPU 21 writes the management information to the management area 41.

As described, with the cache block (AD-cache, or AD-cache to be discussed later) already allocated, a write operation takes place accompanied by a write-back operation. In that case, if the write size is found equal to the logical block size, the data is written to a new cache block without recourse to the write-back, and the old cache block is deleted.

Because the write-back operation is suppressed in the case above, the decrease in write performance attributable to garbage collection is prevented. It should be noted that the delete operation does take place. Performance is kept constant thanks to the absence of garbage collection regardless of the cache block (AD-cache or OD-cache) being allocated or not.

Figure 13:
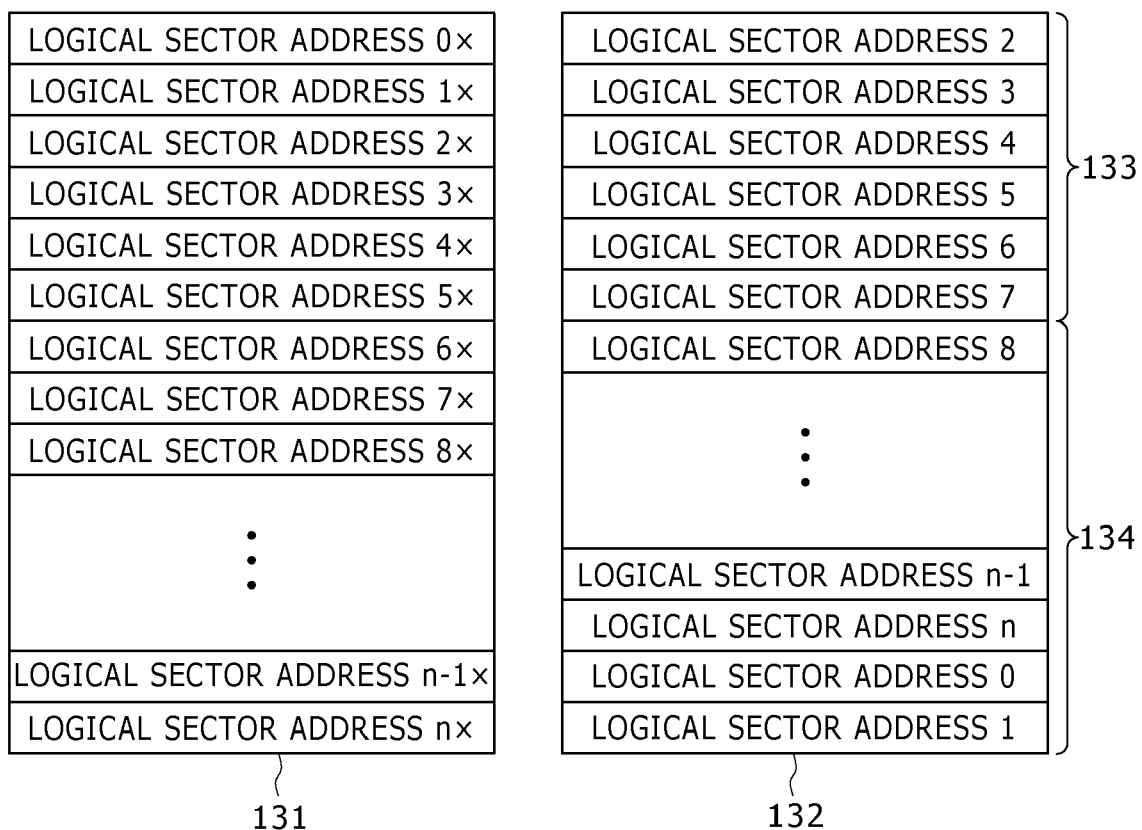
FIG. 13 is a schematic view showing the state of a cache block and that of a user data block upon writing in step S25.

FIG. 13 is a schematic view showing the state of a cache block and that of a user data block upon writing in step S25. Illustratively in FIG. 13, a user data block 131 with logical sector addresses 0 through "n" is juxtaposed with a cache block 132 with written data 133 at logical sector addresses 2 through 7. In this case, data at other logical sector addresses 8 through "n," 0 and 1 are copied from the user data block 131 to the cache block 132 as indicated by reference numeral 134. This puts the cache block 132 in the full state, so that a write-back operation may be carried out to reallocate the cache block.

In other words, as shown in FIG. 13, all data in the user data block 131 is copied to the cache block 132. After the copy operation, the cache block 132 is registered as the user data block 131 in the management information in the memory 22. The user data block in effect before the copy is deleted of its content and registered as a free block in the management data in the memory 22.

The foregoing description has been about the write operation that exceeds the designated logical boundary. What follows is a description of the write operation that falls short of the designated logical boundary.

If in step S10 of FIG. 5 written data is found to have stopped short of the designated logical boundary, then step S11 is reached. In step S11, the CPU 21 writes data to a new cache block (OD-cache). The new cache block (OD-cache) is used for the write operation in step S11 so as to avoid a write-back operation. In step S11, the data is written starting from the beginning of the cache block regardless of logical addresses.

Figure 14:
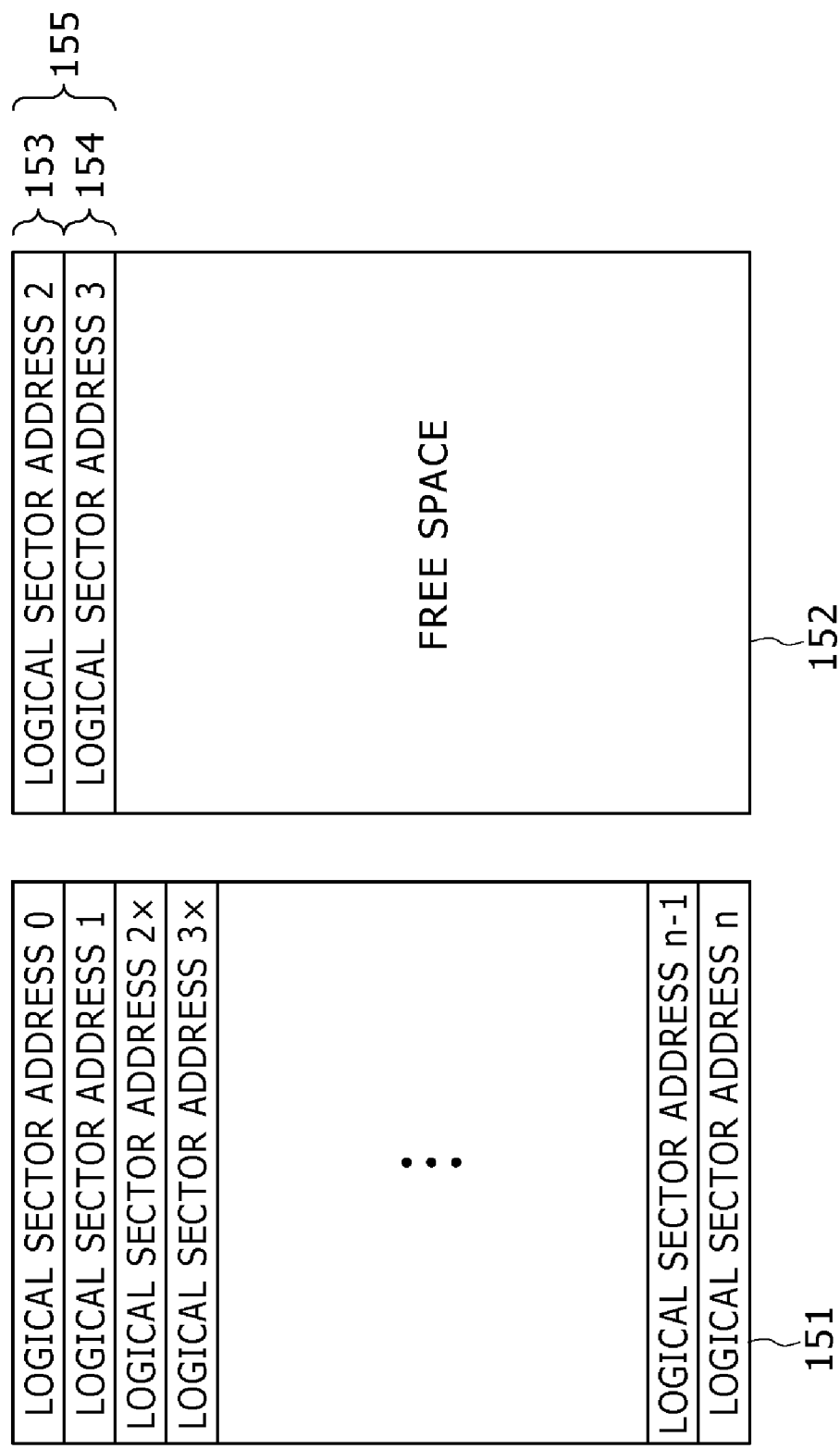
FIG. 14 is a schematic view showing the state of a cache block and that of a user data block upon writing in step S11.

FIG. 14 is a schematic view showing the state of a cache block and that of a user data block upon writing in step S11. Illustratively in FIG. 14, it is assumed that a write operation is performed on logical sector address 2 in a user data block 151. After the write operation, the data 153 written from the host device to logical sector address 2 in a cache block 152 is followed by the data copied from the user data block 151 to logical sector address 3 as indicated by reference numeral 154. The two sectors of data combine to form a designated logical boundary 155. The rest of the cache block is left free of data.

After the write operation in step S11, the CPU 21 goes to step S12 and updates the management information in the memory 22 because the cache block 152 has been allocated anew to the user data block 151. In step S13, the CPU 21 writes the management information to the management area 41.

What is carried out in step S11 is a write operation not accompanied by a write-back operation because a cache block is utilized to deal with the data being written short of the designated logical boundary. In step S11, the data is written starting from the beginning of the cache block regardless of logical addresses.

Illustratively, if a write operation is performed on logical sector address 2 representing the two sectors making up the designated logical boundary 155 in FIG. 14, then after the write operation the cache block 152 appears in the state shown in FIG. 14. That is, the data at logical sector address 2 is written to the beginning of the cache block 152, and the data at logical address 3 is copied from any data in the user data block 151. After the write and copy operations, the management information in the memory 22 is updated to reflect the newly allocated cache block 152. The management information is also written to the management area 41.

In step S31 of FIG. 7, the CPU 21 checks to determine whether or not the condition for writing to the cache block (OD-cache) is met. If in step S31 the condition for writing to the cache block (OD-cache) is found to be met, then step S32 is reached. In step S32, the CPU 21 checks to determine whether or not the cache block (OD-cache) has its written area alone in the full state.

If in step S32 the cache block (OD-cache) is not found to have its written area only in the full state, then step S33 is reached. In step S33, the CPU 21 performs a write operation on the cache block (OD-cache). In step S34, the CPU 21 updates the management information in the memory 22.

Figure 15:
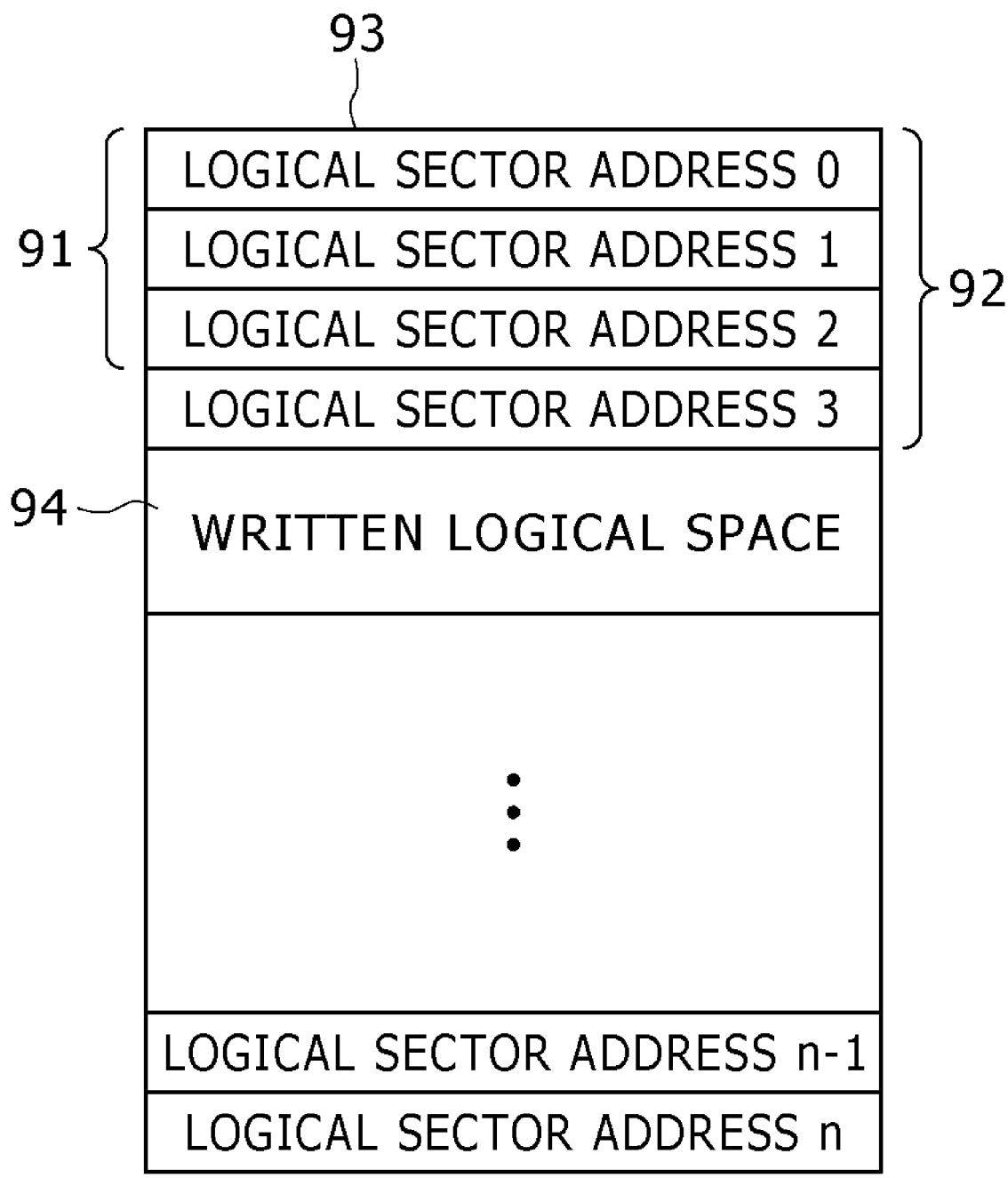
FIG. 15 is a schematic view showing typical write patterns meeting the condition for writing in step S31.

What is carried out in step S31 is to determine whether or not the logical space to which data is about to be written applies to one of logical spaces 91 and 92 which are shown in FIG. 15 and which are located differently relative to the written logical space in the cache block.

FIG. 15 is a schematic view showing typical write patterns meeting the condition for writing in step S31. In FIG. 15, reference numeral 91 denotes the case where data is written within a written space 94, and reference numeral 92 represents the case where data is written in the same area as the written space 94.

What takes place in step S33 is a write operation performed on the allocated cache block without triggering a write-back operation. In step S33, data starts to be written immediately after the written sectors in the cache block.

Figure 16:
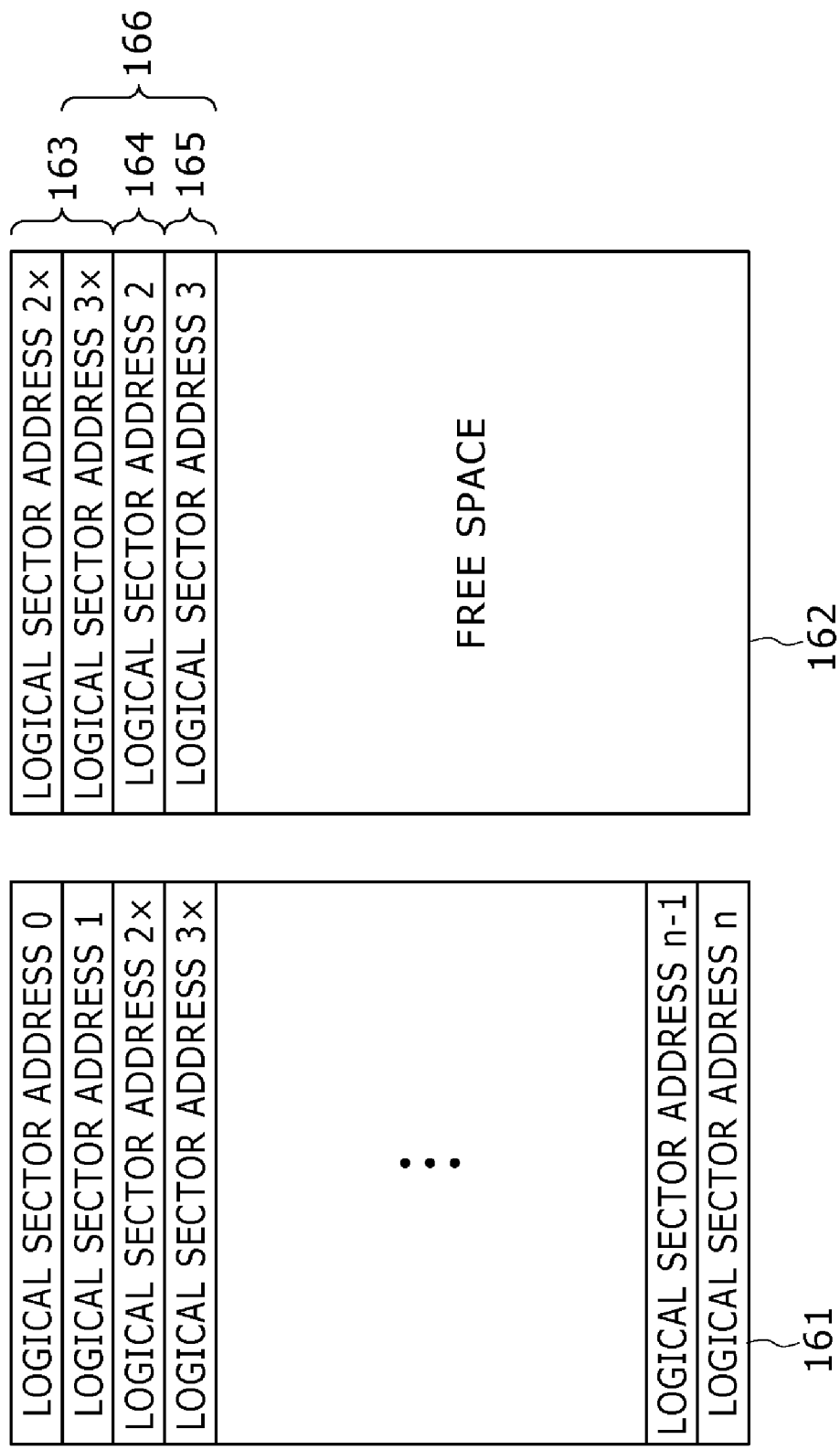
FIG. 16 is a schematic view showing the state of a cache block and that of a user data block upon writing in step S33.

FIG. 16 is a schematic view showing the state of a cache block and that of a user data block upon writing in step S33. Illustratively, suppose that in the state of FIG. 16, data is again written to logical sector address 2 in a user data block 161. In that case, after the writing is done, data 163 written to logical sector addresses 2 and 3 in a cache block 162 is followed by data written to logical sector address 2 from the host device as indicated by reference numeral 164. Data is copied to logical sector address 3 from the user data block as indicated by reference numeral 165. Thereafter, logical sector addresses 2 and 3 indicated by reference numerals 164 and 165 constitute a designated logical boundary 166.

After the writing in step S33, there is no block address change in the cache block. This does not entail any write operation to the management area 41 to save the management information; only the management information in the memory 22 is updated in step S34.

If in step S31 the condition for writing to the cache block (OD-cache) is not found to be met, then step S35 is reached. In step S35, the CPU 21 checks to determine whether or not the condition for writing to the cache block (OD-cache) is met.

Figure 17:
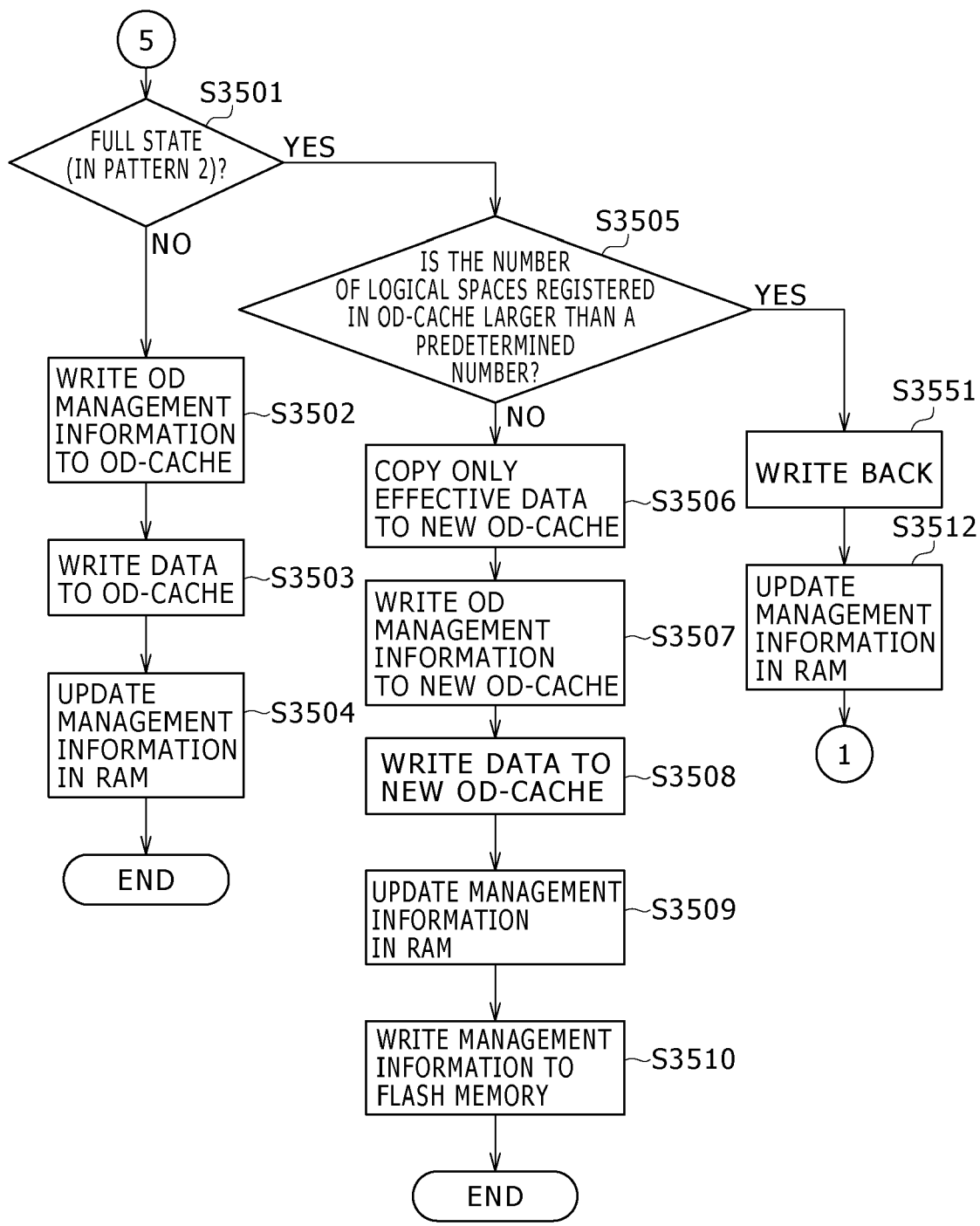
FIG. 17 is a flowchart of steps to be carried out when the condition for writing to a cache block (OD-cache) is met.

If in step S35 the condition for writing to the cache block is found to be met, i.e., if the range to which to write data from the host device falls within the size of the designated logical boundary, then the steps of FIG. 17 are reached and carried out. If the write range is found to exceed the size of the designated logical boundary, then step S39-1 is reached.

Figure 18:
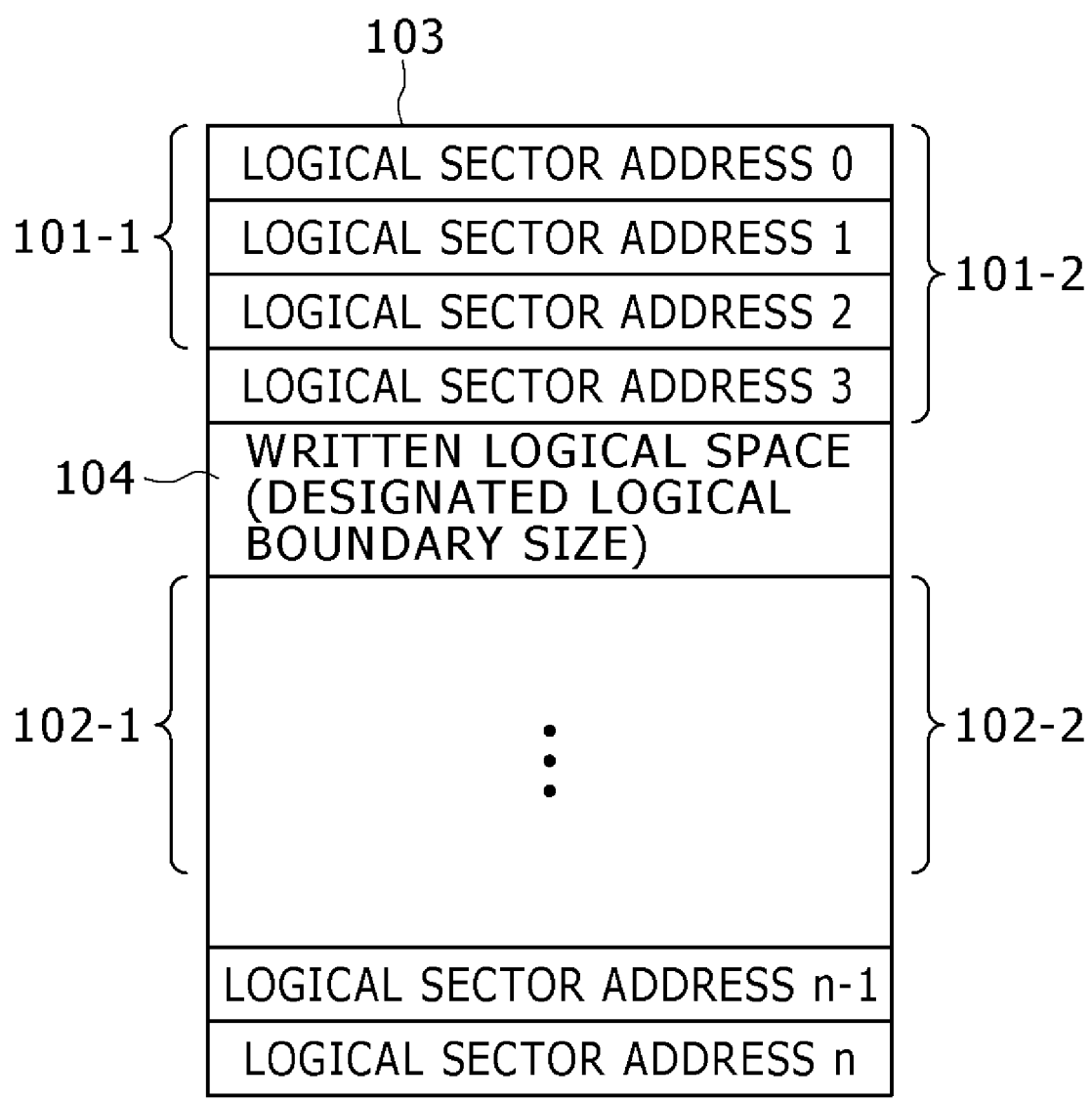
FIG. 18 is a schematic view showing typical write patterns meeting the condition for writing in step S35.

FIG. 18 is a schematic view showing typical write patterns meeting the condition for writing in step S35. What is carried out in step S35 is to determine whether or not the logical space to which data is about to be written applies to one of logical spaces 101-1, 101-2, 102-1, and 102-2 which are shown in FIG. 18 and which are located differently relative to the written logical space in the cache block.

FIG. 17 is a flowchart of steps to be carried out when the condition for writing to a cache block (OD-cache) is met. What follows is a description of the flow of the process constituted by the steps in FIG. 17.

Figure 19:
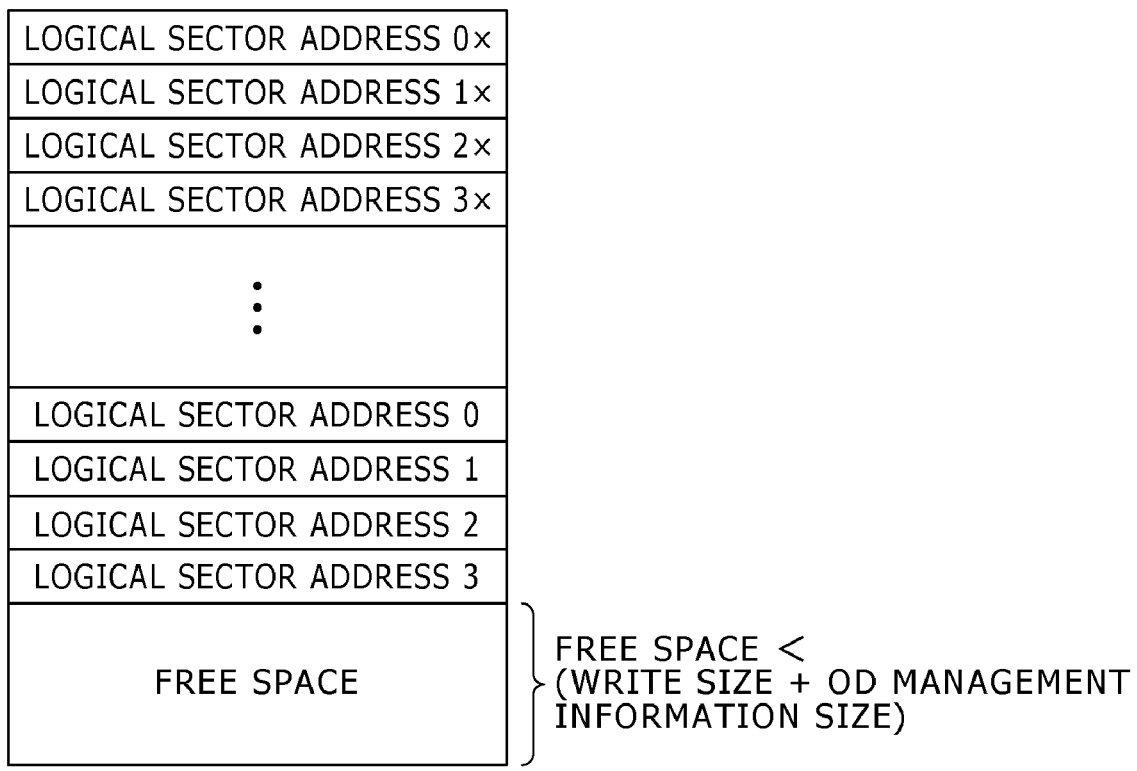
FIG. 19 is a schematic view showing the state of a cache block in the full state (pattern 2) in step S3501.

In step S3501 of FIG. 17, a check is made to determine whether or not additional data from the host device can be written to the cache block (OD-cache). When the check is carried out, OD management information to be written to the cache block (OD-cache) as shown in FIG. 19 is also taken into consideration. If in step S3501 the additional data is found writable to the cache block, then step S3502 is reached. If in step S3501 the additional data is not found writable to the cache block, then step S3505 is reached.

FIG. 19 is a schematic view showing the state of a cache block in the full state (pattern 2) in step S3501. In this case, the size of the free space is smaller than the sum of the write size and the size of the OD management information.

Figure 20:
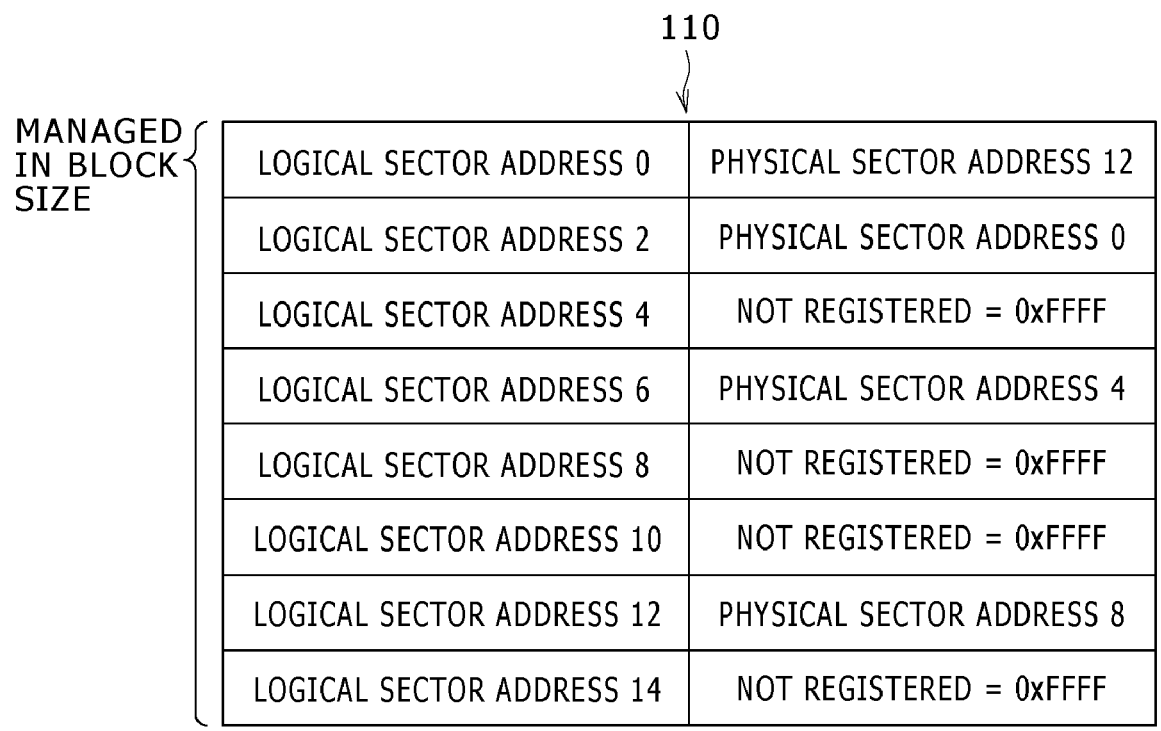
FIG. 20 is a schematic view showing a typical structure of OD management information for use by the embodiment of the invention.

In step S3502, the OD management information 110 (indicating the physical locations of the written data in the OD-cache) such as one shown in FIG. 20 and placed in the RAM is updated because the data is written to a logical space different from that of the currently written data. After the update, the OD management information is added to the cache block (OD-cache) and step S3503 is reached.

The OD management information 110 is saved into the flash memory so that upon start-up, the physical addresses of effective data in the cache block (OD-cache) can be acquired quickly. There is no need to read the entire cache block (OD-cache). Although a limited amount of overhead occurs due to the write operation on the flash memory, the effects of the operation are negligible when compared with an ordinary write-back operation.

FIG. 20 is a schematic view showing a typical structure of OD management information for use by the embodiment of the invention. The OD management information 110 is used to manage block sizes, and is constituted by logical sector addresses and by physical sector addresses corresponding to the logical sector addresses. If no addresses are registered, then the OD management information is composed of settings indicating the absence of registrations.

Figure 21:
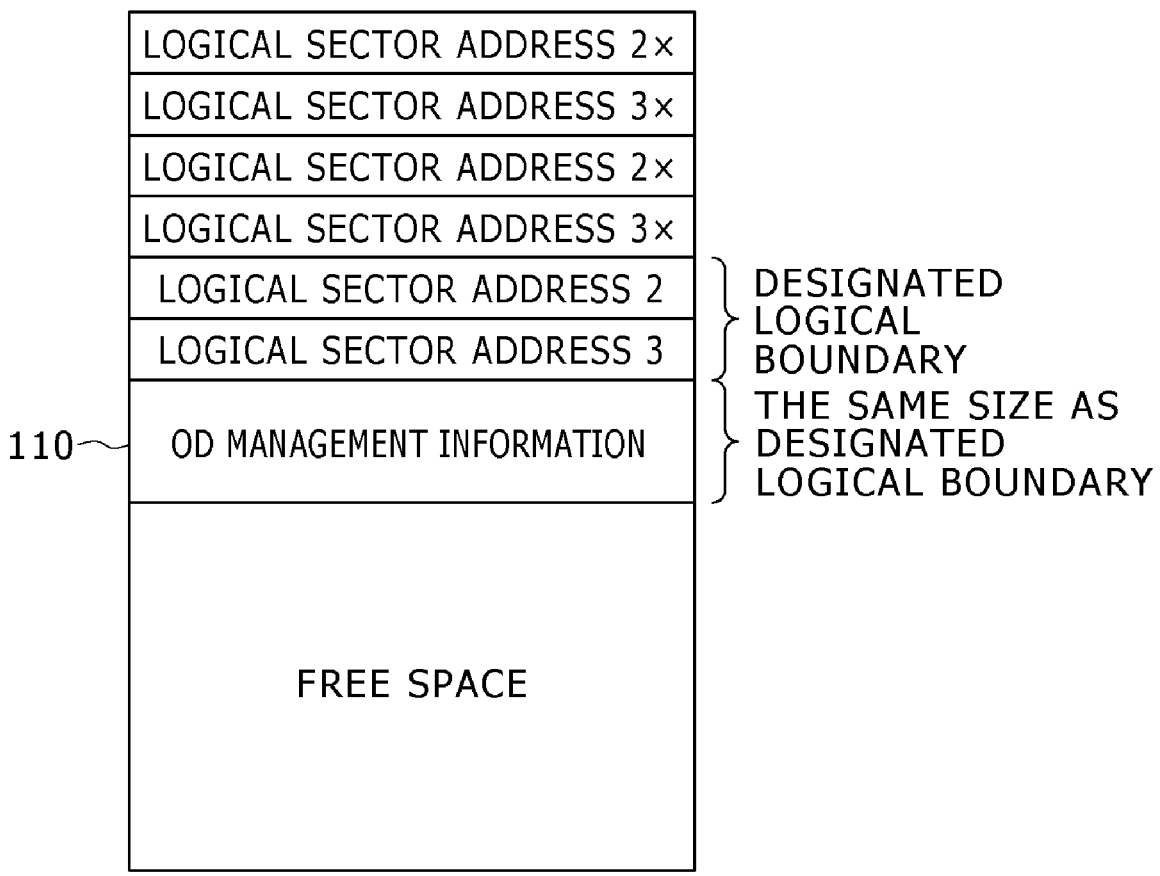
FIG. 21 is a schematic view showing a typical state in effect when OD management information is written to a cache block (OD-cache) in step S3502.

FIG. 21 is a schematic view showing a typical state in effect when OD management information is written to a cache block (OD-cache) in step S3502. In this case, the designated logical boundary is equal to the OD management information 110 in size.

In step S3503, the OD management information 110 is written to the cache block. Then the additional data is written from the host device to the cache block, and step S3504 is reached.

Figure 22:
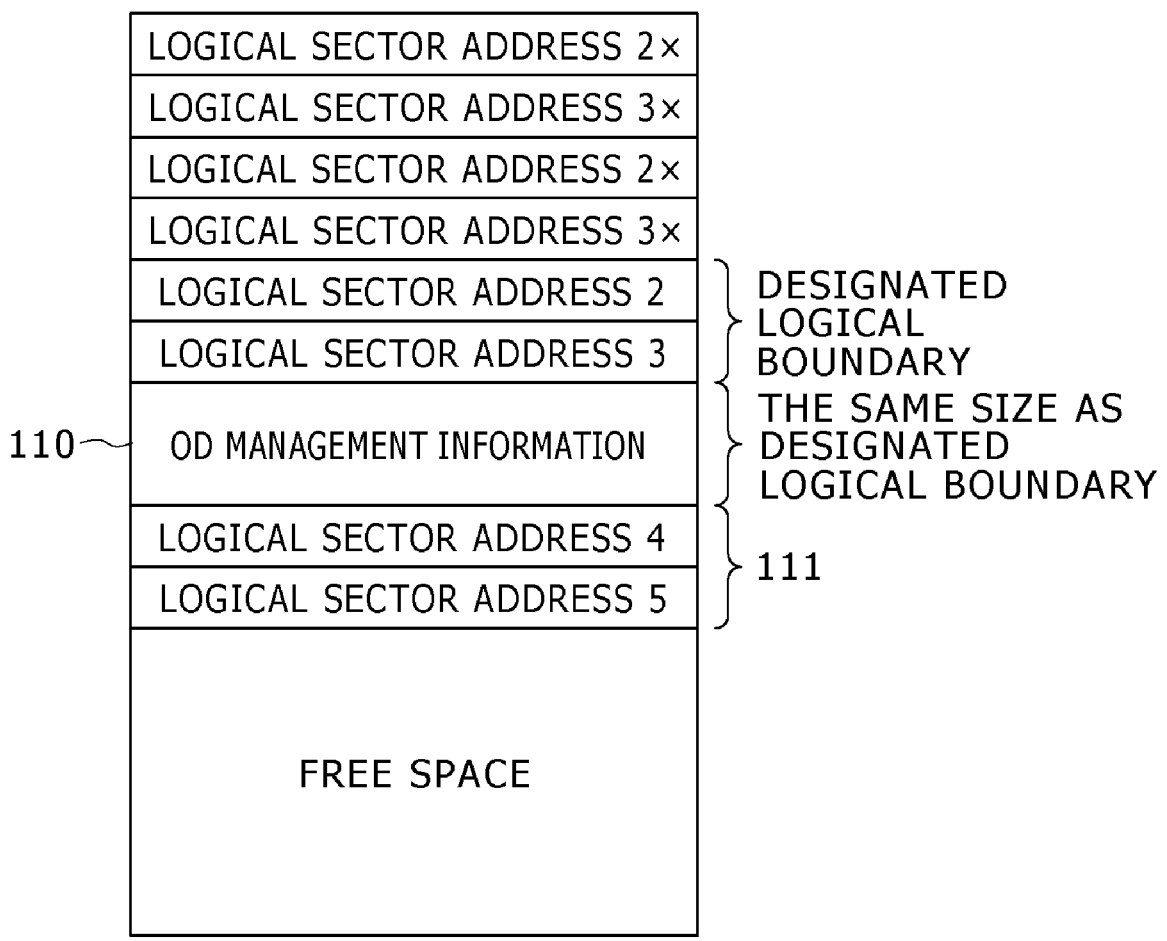
FIG. 22 is a schematic view showing a typical state in effect when the OD management information is written to the cache block (OD-cache) in step s3503.

FIG. 22 is a schematic view showing a typical state in effect when the OD management information is written to the cache block (OD-cache) in step s3503. As shown in FIG. 22, the OD management information is first written to the cache block, followed by the data written from the host device.

In step S3504, the management information in the RAM is updated.

If in step S3501 the additional data is not found writable to the cache block, then step S3505 is reached. In step S3505, a check is made to determine whether or not the number of logical spaces registered in the cache block (OD-cache) is larger than a predetermined number. If in step S3505 the number of registered logical spaces is found to be larger than the predetermined number, then step S3511 is reached. If in step S3505 the logical space count is found to be smaller than the predetermined number, then step S3506 is reached.

Figure 23:
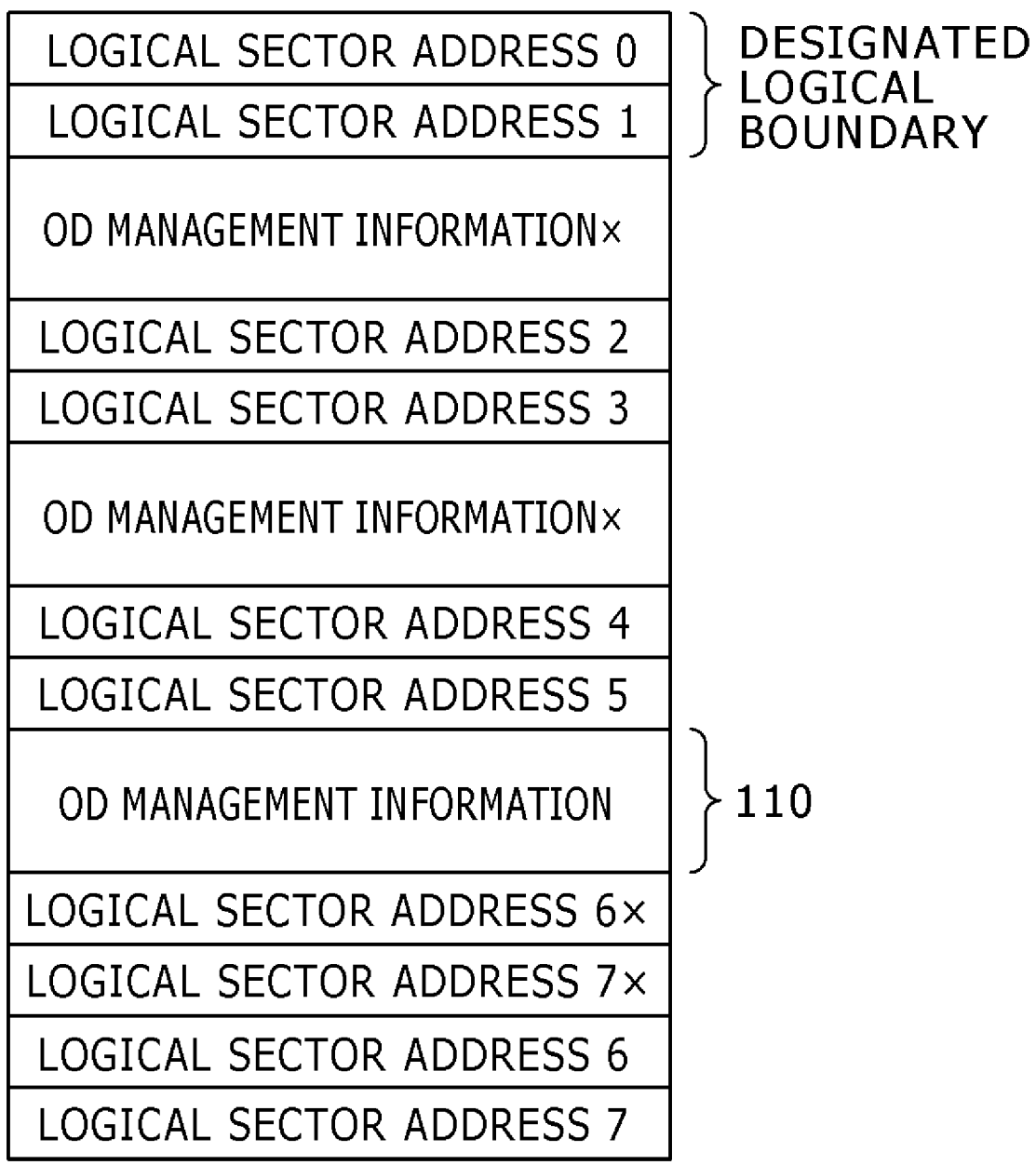
FIG. 23 is a schematic view showing how a plurality of logical data are written to the cache block (OD-cache) in step S3505.

FIG. 23 is a schematic view showing how a plurality of logical data are written to the cache block (OD-cache) in step S3505. In this case, the OD management information 110 most recently written to the cache block becomes effective.

In step S3506, the effective data held in the cache block (OD-cache) is copied to a new cache block (OD-cache). The OD management information in the RAM is also updated at this point, and step S3507 is reached. The reason the effective data is copied to a new cache block is as follows: The data written in the cache block (OD-cache) includes FATs and other entries that involve frequent updates of the same logical addresses. Once written to the cache block (OD-cache), the data is expected to be updated frequently and thus to entail more overhead if subjected to a write-back operation than if copied (i.e., all pages in the block are copied followed by two block deletes).

Figure 24:
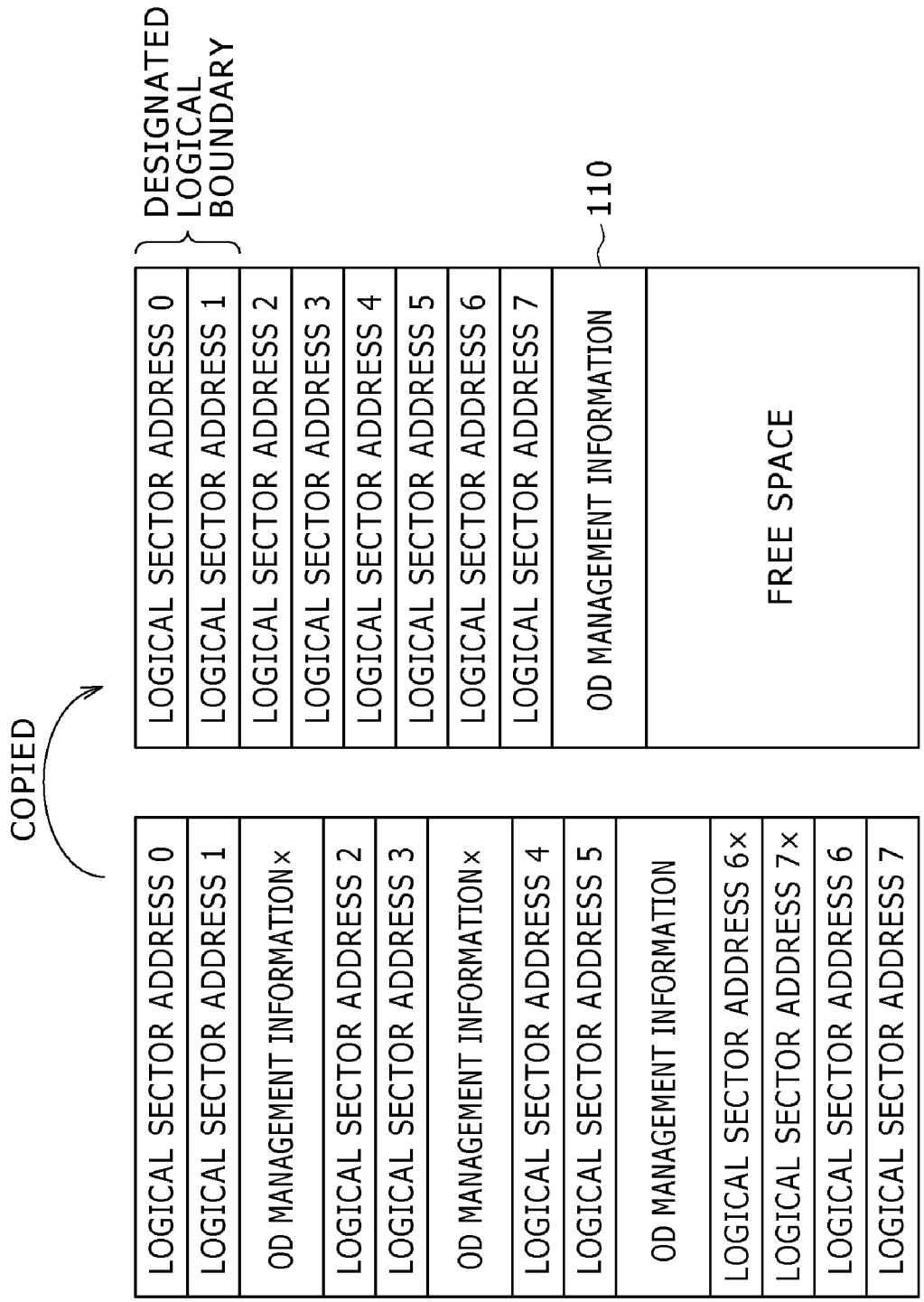
FIG. 24 is a schematic view showing a typical state in effect after effective data is copied to a new cache block (OD-cache) in step S3506.

FIG. 24 is a schematic view showing a typical state in effect after effective data is copied to a new cache block (OD-cache) in step S3506. Upon copying of the effective data, the effective OD management information 110 most recently written is copied. Before the copied OD management information are located logical sector addresses 0 through 7 filled with data. Subsequent to the OD management information 110 is a free area.

In step S3507, the OD management information 110 in effect after the effective data was copied to the new cache block (OD-cache) is additionally written to the new cache block (OD-cache). Step S3507 is followed by step S3508.

In step S3508, with the OD management information saved, data is additionally written to the new cache block from the host device. Step S3508 is followed by step S3509.

Step S3511 and subsequent steps are the same as step S39 and subsequent steps in FIG. 7, to be discussed below.

If in step S35 the range to which to write data is not found subsequent to the logical boundary designated in the cache block (OD-cache), then step S39-1 is reached. In step S39-1, the CPU 21 checks to determine whether or not the write size is equal to the logical block size. If in step S39-1 the write size is not found equal to the logical block size, then step S39 is reached and the CPU 21 performs a write-back operation. In step S40, the CPU 21 updates the management information in the memory 22. What is performed in step S39 is to acquire a new cache block (AD-cache) for carrying out the write-back when a write operation takes place.

Figure 25:
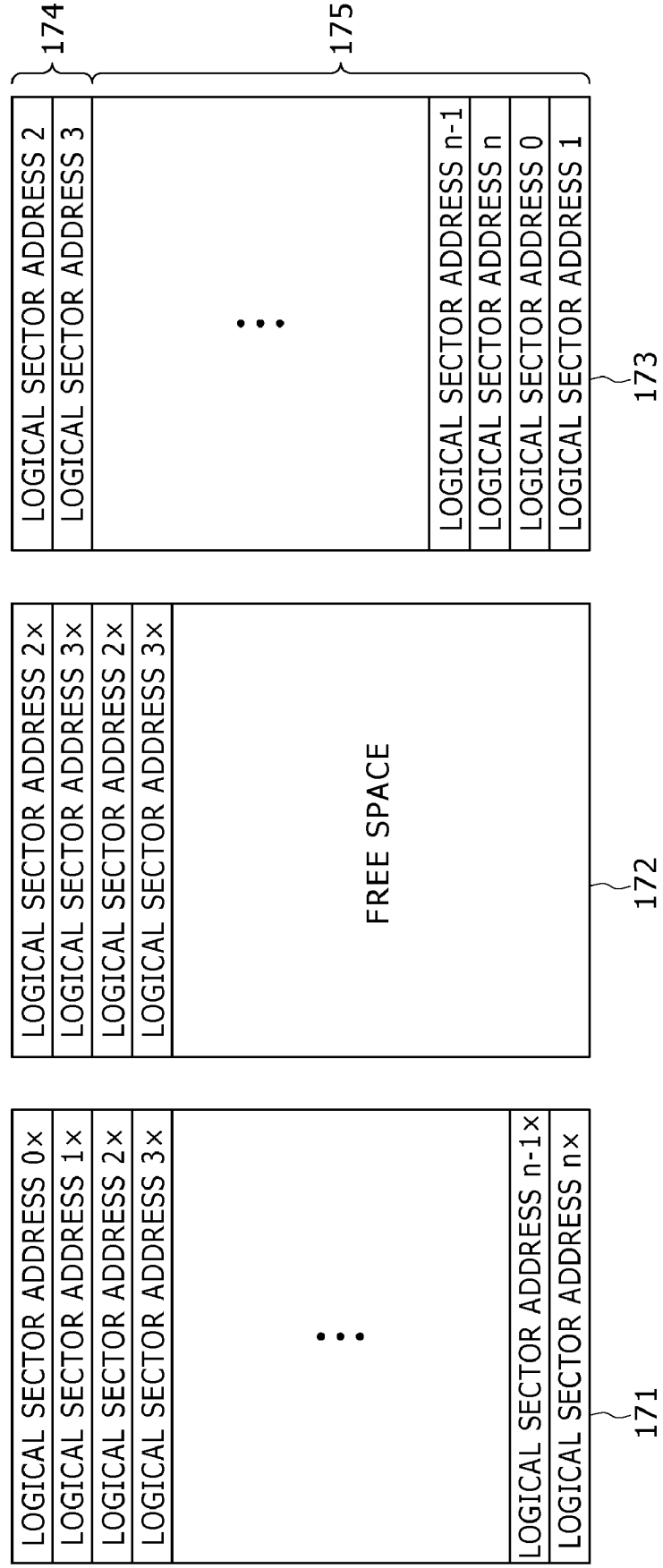
FIG. 25 is a schematic view showing the state of a cache block and that of a user data block upon writing in step S39.

FIG. 25 is a schematic view showing the state of a cache block and that of a user data block upon writing in step S39. Illustratively, the data at logical sector address 2 and 3 in a cache block 172 is first copied to a new cache block 173 as indicated by reference numeral 174. Thereafter, the data at other logical sector addresses 4 through "n," 0 and 1 in a user data block 171 is copied to the new cache block 173 as indicated by reference numeral 175. Starting from the state of FIG. 16, executing the write-back operation in step S39 brings about the state shown in FIG. 24.

Following the copy operation in connection with the write-back in step S39, the new cache block 173 is registered as the user data block 171 in the management information. The old user data block 171 is deleted of its content and registered as a free block in the management information.

If in step S32 the cache block (OD-cache) is found to have solely its written area in the full state, then step S41 is reached. In step S41, the CPU 21 performs a write operation on a new cache block (OD-cache). Using the new cache block in step S41 makes it possible to write the data without triggering a write-back operation. In step S41, the data starts to be written from the beginning of the cache block regardless of logical addresses.

After the write operation in step S41, step S42 is reached. In step S42, the CPU 21 updates the management information in the memory 22 because the cache block has been allocated anew to the user data block. In step S43, the CPU 21 writes the management information to the management area 41. What is performed in step S41 is to carry out a cache block update without triggering a write-back operation thanks to the newly acquired cache block (OD-cache).

Figure 27:
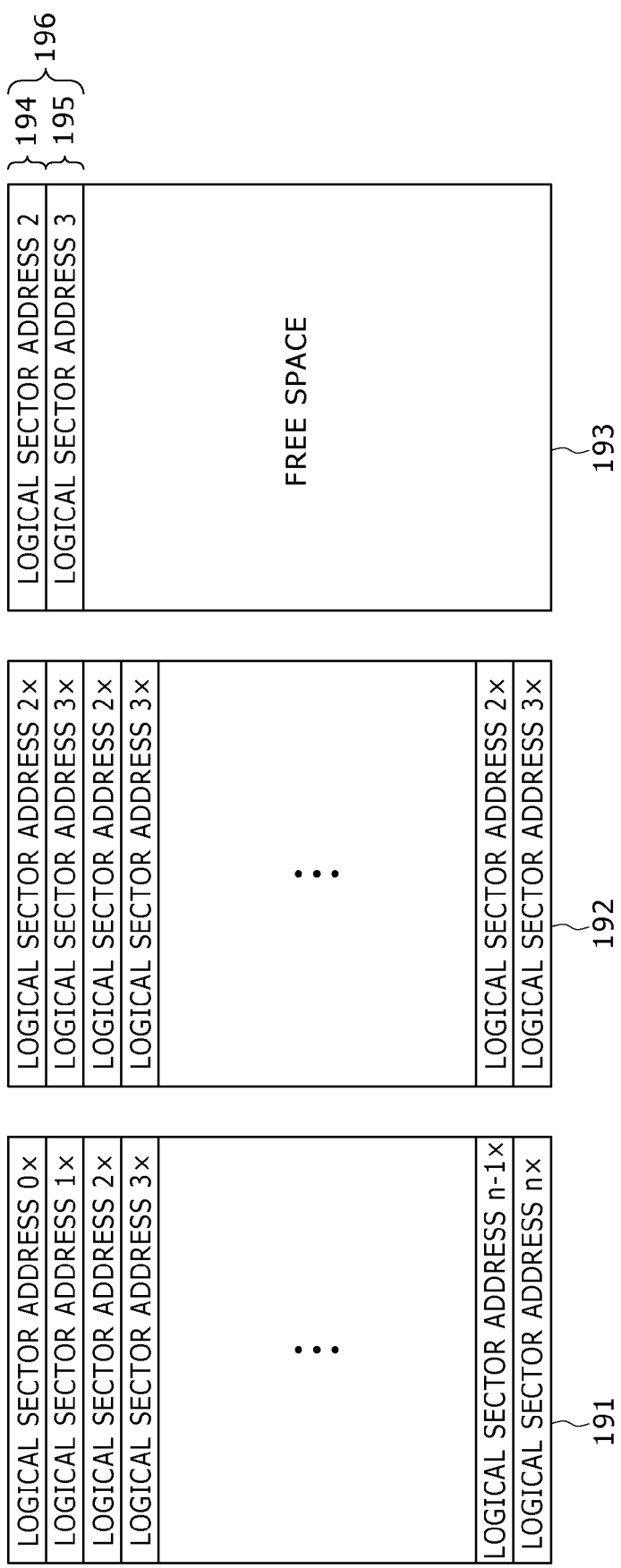
FIG. 27 is a schematic view showing the state of the cache block and that of the user data block after writing in step S41.

FIG. 26 is a schematic view showing the state of a cache block and that of a user data block before writing in step S41. FIG. 27 is a schematic view showing the state of the cache block and that of the user data block after writing in step S41.

Illustratively, suppose that with a cache block 182 and a user data block 181 formed as shown in FIG. 26, another write operation is carried out on logical sector address 2. In such a case, as indicated in FIG. 27, the data from the host device is written to logical sector address 2 at the beginning of a cache block 193 as indicated by reference numeral 194, followed by the data copied to logical sector address 3 from a user data block 191.

After the copy operation in step S41, the new cache block 193 is registered as the new user data block in the management information. The old user data block 191 is deleted of its content and registered as a free block in the management information.

If in step S35 the range to which to write data is found subsequent to the logical boundary designated in the cache block (OD-cache), then step S36 is reached. In step S36, the CPU 21 performs a write operation on a new cache block (AD-cache). Using the new cache block in step S36 makes it possible to write the data without triggering a write-back operation. In step S36, the data starts to be written from the beginning of the cache block regardless of logical addresses.

Figure 28:
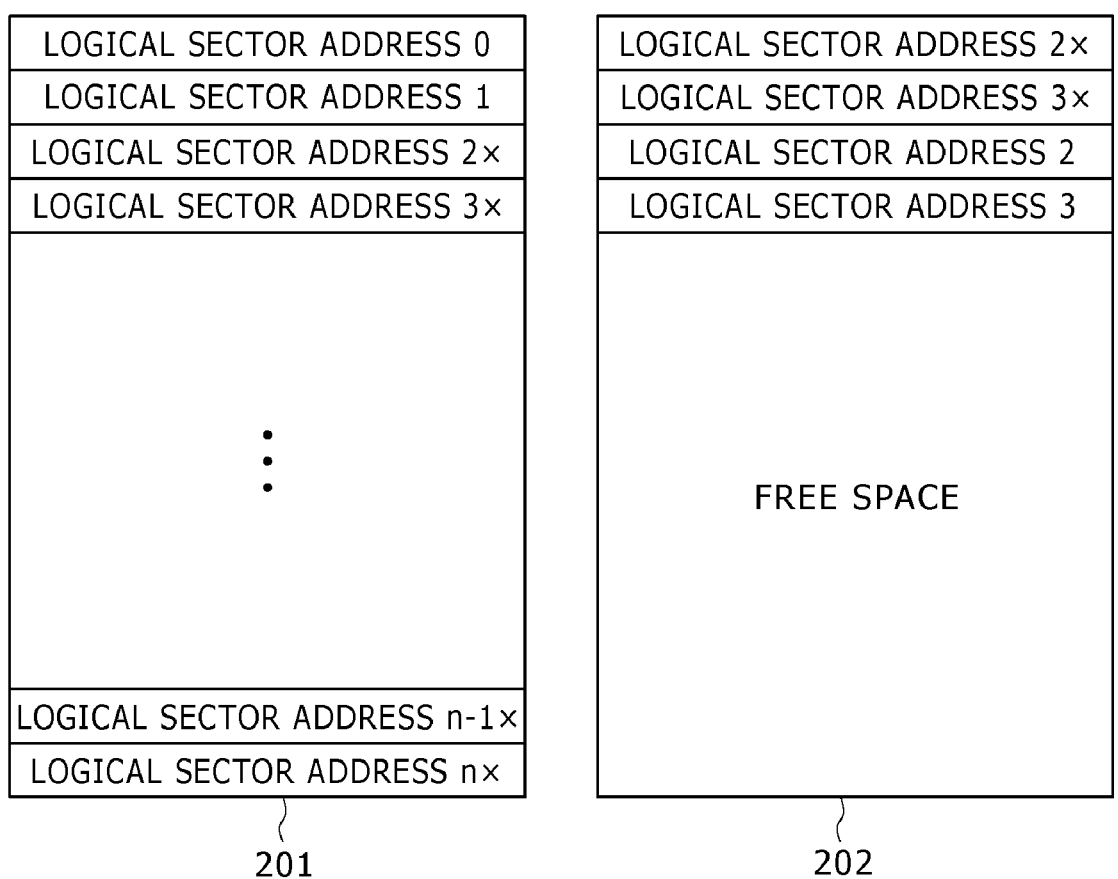
FIG. 28 is a schematic view showing the state of a cache block and that of a user data block before writing in step S36.
Figure 29:
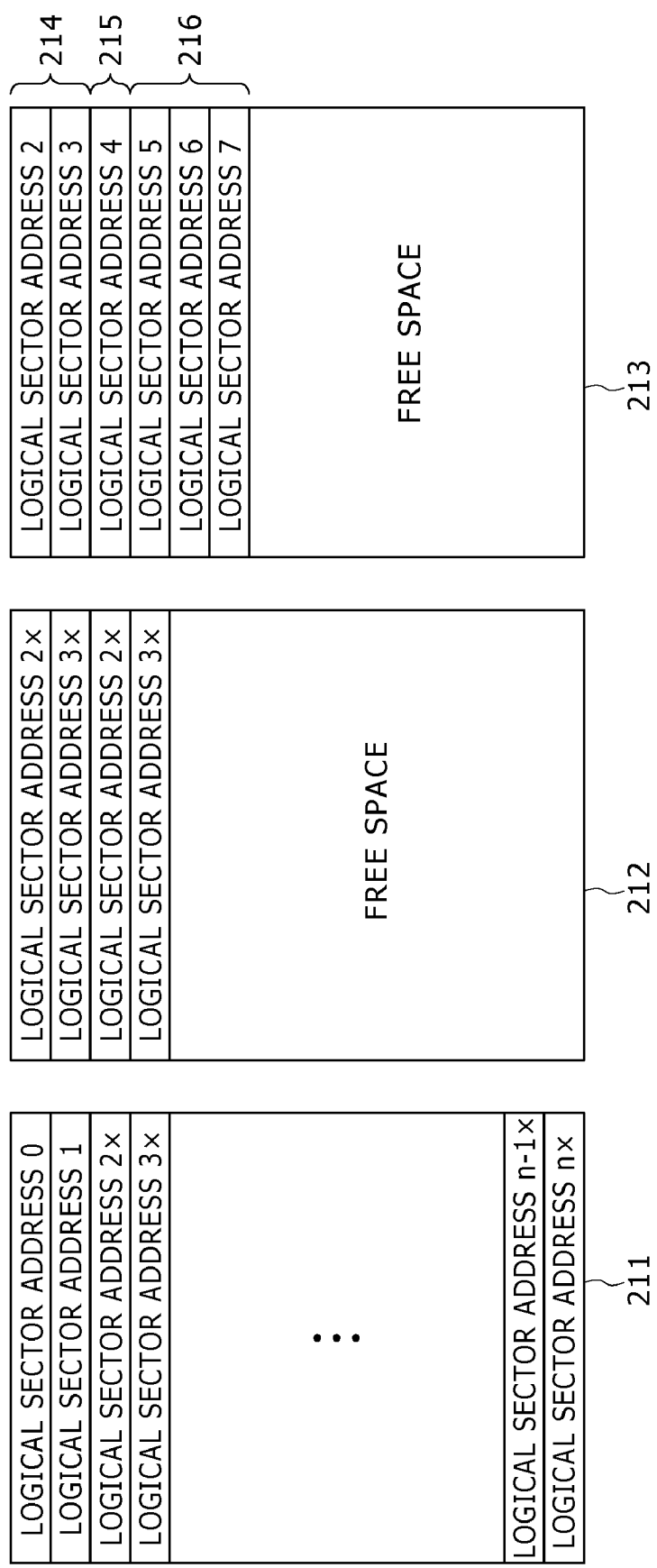
FIG. 29 is a schematic view showing the state of the cache block and that of the user data block after writing in step S36.

FIG. 28 is a schematic view showing the state of a cache block and that of a user data block before writing in step S36. FIG. 29 is a schematic view showing the state of the cache block and that of the user data block after writing in step S36.

Illustratively, suppose that with a cache block 202 and a user data block 201 formed as shown in FIG. 28, data is written to logical addresses 5 through 7 in the user data block 201. In this case, as indicated in FIG. 29, the data at logical sector addresses 2 and 3 is copied from the cache block 212 to the beginning of a new cache block 213 as indicated by reference numeral 214, followed by the data copied to logical sector address 4 from a user data block 211 as indicated by reference numeral 215. After the copying of the data 215, data is written from the host device to logical sector addresses 5 through 7 as indicated by reference numeral 216.

After the write operation in step S36, step S37 is reached. In step S37, the CPU 21 updates the management information in the memory 22 because the cache block 213 has been allocated anew to the user data block 211. In step S38, the CPU 21 writes the management information to the management area 41. What is carried out in step S41 is to perform a write operation without triggering a write-back operation thanks to the newly acquired cache block (AD-cache) when the condition for writing in step S35 met.

Before the writing in step S36, the data indicated by reference numeral 214 is copied from the cache block 212 to the new cache block 213. Data is then written starting from the sector immediately after the copied data 214. If data cannot be written to the sector immediately after the copied data 214, then the user data 214 is copied up to the write start sector address. After the writing in step S36, the new cache block 213 is registered as the new cache block 212 in the management information, and the old cache block 212 is deleted.

If in step S39-1 the write size is found not equal to the logical block size, then step S41 is reached. In step S41, the CPU 21 writes data full to a new cache block (AD-cache). In step S42, the CPU 21 checks to determine whether or not the cache block (AD-cache) is already allocated.

If in step S42 the cache block (AD-cache) is found to be allocated, then step S43 is reached. In step S43, the CPU 21 deletes the allocated cache block (AD-cache). After deleting the allocated cache block (AD-cache) in step S43, the CPU 21 goes to step S44. In step S44, the CPU 21 updates the management information in the memory 22 to reflect the allocated cache block 112 having been deleted with regard to the user data block 111. In step S45, the CPU 21 writes the management information to the management area 41.

If in step S42 the cache block (AD-cache) is not found allocated, then step S46 is reached. In step S46, the CPU 21 updates the management information in the memory 22 to reflect the cache block (AD-cache) being unallocated with regard to the user data block 111. In step S47, the CPU 21 writes the management information to the management area 41.

As described, if a write operation is performed accompanied by a write-back operation with a cache block (OD-cache or AD-cache) already allocated, and if the write size is found to be equal to the logical block size, then data is written to a new cache block without recourse to the write-back and the old cache block is deleted.

Because the write-back operation is suppressed in the case above, the decrease in write performance attributable to garbage collection is prevented. It should be noted that the delete operation does take place. Performance is kept constant thanks to the absence of garbage collection regardless of the cache block (AD-cache) being allocated or not.

Where the written data does not exceed a given designated logical boundary, part of the management information is saved into the cache block (OD-cache). More specifically, part of the OD management information is written to the block where user data is retained. This arrangement makes it possible to maintain data spanning a plurality of logical spaces in the cache block (OD-cache) while the size of the management information in the flash memory is kept unchanged. That in turn helps reduce the frequency of write-back operations significantly.

In this manner, the amount of management information can be raised without changing the size of the existing management information held in the flash memory and without altering the timing of management information updates. Increasing the amount of management information translates into an appreciable decrease of write-back operations (and practical suppression thereof) With the frequency of write-back operations thus reduced, garbage collection and flash memory erasure take place much less frequently than before, whereby the drop in write performance can be prevented. When the flash memory is deleted of its content less often, it is possible to prolong the life of the flash memory whose rewritable count (i.e., delete count) is limited.

In particular, media that utilize FATs are characterized by the layout of discontinuous (intermittent) logical addresses such as those in FAT1 and FAT2. This type of media is subject to frequent write operations on the same addresses. The memory control method proposed by the present invention is all the more effective when used in conjunction with such media having large block sizes (e.g., FAT1 and FAT2 found in the same block).

In addition, where the written data does not exceed a given designated logical boundary, part of the management information may be kept in the cache block (OD-cache) so as to accelerate the acquisition of the management information upon start-up. That is, a read operation on the last-written page in the OD permits acquisition of the location where the management information is retained, so that a second read operation allows the management information to be obtained. With no need to write the management information, reading the entire content of the cache block (OD-cache) makes it possible to make up the management information. As a result, the acquisition of the management information upon start-up is made appreciably faster than before.

Figure 30:
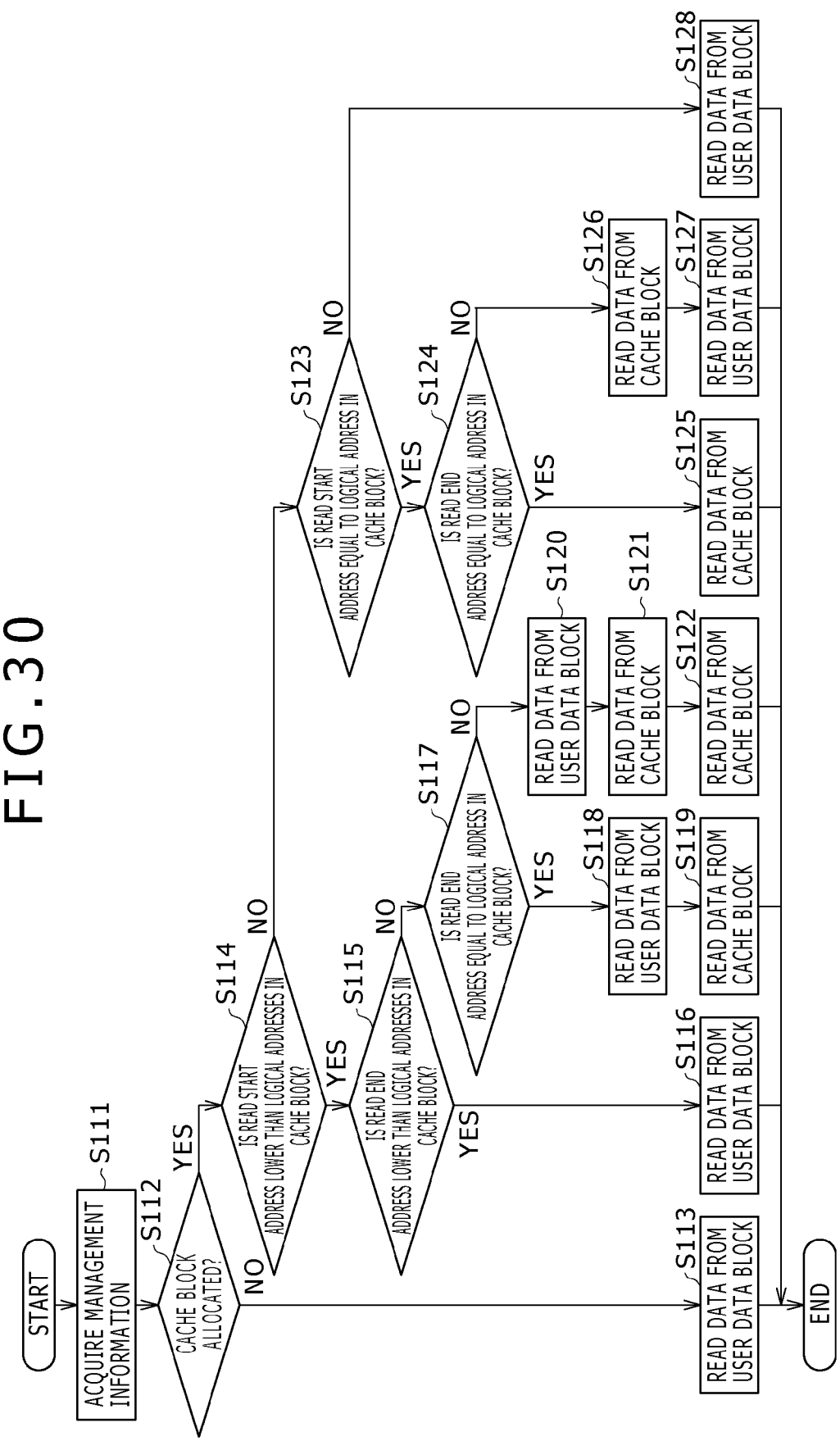
FIG. 30 is a flowchart of steps making up the write process in units of a logical block.

FIG. 30 is a flowchart of steps making up the write process in units of a logical block. In step S111 of FIG. 30, the CPU 21 acquires address information and written logical space information about user data blocks from management information. The CPU 21 also acquires address information and written logical space information about cache blocks, the address information corresponding to the logical addresses of the user data blocks.

In step S112, the CPU 21 checks to determine whether or not there is a cache block allocated to a user data block of interest. If in step S112 no cache block is found allocated to the user data block, then step S113 is reached. In step S113, the CPU 21 reads data from the user data block and sends the read data to the host device. Step S113 is carried out when no cache block is allocated to the logical block from which data is requested to be read.

If in step S112 a cache block is found allocated to the user data block, then step S114 is reached. In step S114, the CPU 21 checks to determine whether or not the read start address is smaller than the logical addresses in the cache block. If in step S114 the read start address is found to be smaller than the logical addresses in the cache block, then step S115 is reached. In step S115, the CPU 21 checks to determine whether or not the read end address is smaller than the logical addresses in the cache block. If in step S115 the read end address is found to be smaller than the logical addresses in the cache block, then step S116 is reached. In step S116, the CPU 21 reads data from the user data block and supplies the read data to the host device.

If in step S114 the read start address is not found to be smaller than the logical addresses in the cache block, then step S123 is reached. In step S123, the CPU 21 checks to determine whether or not the read start address is equal to a logical address in the cache block. If in step S123 the read start address is not found equal to any logical address in the cache block, then step S128 is reached. In step S128, the CPU 21 reads data from the user data block and sends the read data to the host device.

Steps S116 and S128 are carried out when the cache block is allocated but the data at the logical address from which the data is requested to be read is not found in the cache block. In these steps, the data is read from the user data block out to the host device.

If in step S115 the read end address is not found smaller than the logical addresses in the cache block, then step S117 is reached. In step S117, the CPU 21 checks to determine whether or not the read end address is equal to a logical address in the cache block. If in step S117 the read end address is found equal to a logical address in the cache block, then step S118 is reached. The CPU 21 reads the data from the user data block in step S118 and reads the rest of the data from the cache block in step S119, the read data being sent to the host device.

If in step S117 the read end address is not found equal to any logical address in the cache block, then step S120 is reached. The CPU 21 reads the data from the user data block in step S120, reads the subsequent data from the cache block in step S121, and reads the remaining data from the cache block in step S122, the read data being supplied to the host device.

If in step S123 the read start address is found equal to a logical address in the cache block, then step S124 is reached. In step S124, the CPU 21 checks to determine whether or not the read end address is equal to a logical address in the cache block. If in step S124 the read end address is found equal to a logical address in the cache block, then step S125 is reached. In step S125, the CPU 21 reads the data from the cache block and sends the read data to the host device.

If in step S124 the read end address is not found equal to any logical address in the cache block, then step S126 is reached. The CPU 21 reads the data from the cache block in step S126 and reads the remaining data from the user data block in step S127, the read data being sent to the host device.

Steps S118 and S119, S120 through S122, S126 and S127 are the steps in which both the data in the user data block and the data in the cache block are read out. The read operation in such cases consists of a first and a second part. In the first part, the data in the user data block is read out to the host device. In the second part, if the data corresponding to the logical sector address requested by the host device is found to exist in the cache block, then the data in the cache block is read out to the host device. If the data in question is not found to exist in the cache block, the data is read from the user data block and sent to the host device. Step S125 is a step in which the data in the cache block is read out to the host device.

As described above, the nonvolatile memory (NAND type flash memory) exemplified by the flash memories 23 has two characteristics: data cannot be overwritten in the memory, and data is deleted in units of a block. It follows that in case of a data update, the memory apparatus exemplified by the memory card 20 requires saving the update data in units of a block into other blocks regardless of the update data size in order to maintain the consistency of the logical/physical table.

For that reason, it is necessary to copy the data in the original block except for the update data. After the update, the block having the unnecessary data needs to be deleted of its content (i.e., write-back operation). Furthermore, the blocks are each subject to a limited rewritable count.

The memory control method embodying the present invention controls blocks using cache blocks in a manner involving fewer write-back operations than ordinary control methods for memory apparatuses. The reduced frequency of write-back operations in turn lowers the number of times copy and delete operations are carried out, so that the processing speed of data update operations is boosted. Because the block delete count is reduced, the life of the memory apparatus as a product is prolonged correspondingly.

When the host device is to write file data that exceeds a designated logical boundary, i.e., a logical space size in units of a plurality of sectors, the data is written to a newly allocated cache block in order to suppress a write-back operation. With the write-back prevented, garbage collection is inhibited and write performance is improved correspondingly. The suppression of write-back operations in turn reduces the number of times blocks are deleted of their contents, whereby the life of the memory product is prolonged.

When the data to be written does not exceed a designated logical boundary, part of management information is saved in a cache block (OD-cache) according to the inventive memory control method. More specifically, part of the OD management information is stored into the block in which user data is retained. This makes it possible to save data spanning a plurality of logical spaces into the cache block (OD-cache) without changing the size of the management information stored in the flash memory, whereby write-back operations are performed less often than before.

A read operation on the last-written page in the OD permits acquisition of the location where the management information is retained, so that a second read operation allows the management information to be obtained. With no need to write the management information, reading the entire content of the cache block (OD-cache) makes it possible to make up the management information. As a result, the acquisition of the management information upon start-up is made appreciably faster than before.

Where data is to be written from the host device, the data is written starting from the beginning of a cache block regardless of the logical address space to which to write the data. This feature suppresses copy operations within the cache block, which translates into an increase in write performance.

When file data subsequent to the data written in the preceding example is to be written in a manner not limited to any cluster boundary, the data can be added to the cache block. This also suppresses write-back operations. With the write-back inhibited, garbage collection is prevented and write performance is enhanced accordingly.

When write-back operations are suppressed, block delete operations are reduced correspondingly, which helps prolong the life of the memory product. The block addresses alone of cache blocks are managed in such a manner that if there is no block address change, then management information need not be updated. This contributes to improving write performance.

Furthermore, the reduction in the frequency of management information update operations translates into an appreciable drop in the number of times the block with management information held therein is deleted of its content. This helps prolong the life of the memory product.

When data is added to the cache block in order to suppress write-back operations, garbage collection is inhibited and write performance is enhanced. With the write-back suppressed, the number of times blocks are deleted of their contents are reduced, which brings about a longer life of the memory product. Only the block addresses of cache blocks are managed in such a manner that if block addresses are not changed, then management information need not be updated. This helps improve write performance. The reduced frequency of management information update operations translates into a significant decrease in the number of times the block with management information held therein is deleted of its content. This contributes to prolonging the life of the memory product.

Where the cache block of interest is in the full state, a write-back operation to the user block is carried out without triggering garbage collection. This makes it possible to improve write performance.

When the host device is to write FATs and directory entries constituting management information that falls short of a designated logical boundary, i.e., a logical space size in units of a plurality of sectors, the data is written to a newly allocated cache block in order to suppress a write-back operation. With the write-back thus suppressed, garbage collection is prevented and write performance is improved. The suppression of write-back operations in turn reduces the number of times blocks are deleted of their contents, whereby the life of the memory product is prolonged.

When further data is to be written to the same logical address space following a write operation, then the data is added to the cache block in order to suppress a write-back operation. With the write-back thus inhibited, garbage collection is prevented and write performance is enhanced correspondingly. The suppression of write-back operations in turn reduces the number of times blocks are deleted of their contents, whereby the life of the memory product is prolonged.

Where the block addresses alone of cache blocks are managed, management information need not be updated provided block addresses are not changed. This helps improve write performance. The reduced frequency of management information update operations translates into a significant decrease in the number of times the block with management information held therein is deleted of its content. This contributes to prolonging the life of the memory product.

When data is additionally written to the cache block of interest, the write-back is suppressed and so is garbage collection. This helps improve write performance. Inhibiting write-back operations contributes to reducing the number of block delete operations, whereby the life of the memory product is prolonged. Where only the block addresses of cache blocks are managed, management information need not be updated provided block addresses are not changed. This brings about an increase in write performance. The reduced frequency of management information update operations promises a significant drop in the number of times the block with management information held therein is deleted of its content. This helps prolong the life of the memory product.

When a data write operation is performed on a cache block in the full state, the data is written to another cache block. This suppresses both a write-back operation and garbage collection and enhances write performance. Because the suppression of the write-back translates into a reduced number of times blocks are deleted of their contents, the life of the memory product is prolonged.

If a file data write operation takes place after FATs or directory entries constituting management information have been written, then the data is written to another cache block so that a write-back operation may be inhibited. This in turn suppresses garbage collection and helps boost write performance. Because the suppression of write-back operations makes it possible to reduce the number of times blocks are deleted of their contents, the life of the memory product is prolonged.

Where there is no free cache block available, a cache block with a low update frequency is preferentially allocated for a write-back operation. Giving priority to a cache block with a low update frequency upon write-back operation improves the use efficiency of cache blocks with regard to write operations. This feature is provided because cache blocks with low update frequencies are less likely to have data written thereto than cache blocks with high update frequencies.

When the use efficiency of cache blocks for write operations is thus enhanced, the write-back is suppressed and so is garbage collection, whereby write performance is boosted. The suppression of write-back operations translates into a reduced frequency of block delete operations, which prolongs the life of the memory product.

Where there is no free cache block available, a cache block in the full state is preferentially subjected to garbage collection. When a cache block in the full state is allocated preferentially for a write-back operation, it is possible to raise the use efficiency of cache blocks with regard to write operations. That is because there is no need to use cache blocks if they are in the full state.

Where the use efficiency of cache blocks is improved in terms of write operations, garbage collection is suppressed and write performance is enhanced correspondingly. With the write-back inhibited, block delete operations are reduced so that the life of the memory product is prolonged. As long as cache blocks are in the full state, there is no need to copy the data in each block through garbage collection. This helps enhance performance.

The steps and processes discussed above in detail may be arranged into programs that may be executed by a CPU or other suitable computing apparatus. These programs may be stored on such recording media as semiconductor memories, magnetic disks, optical disks, or floppy disks (registered trademark). A suitable piece of such media carrying the programs may be attached to a computer. In turn, the computer may access and carry out the programs retained on the attached recording medium.

It should be understood by those skilled in the art that various modifications, combinations, sub-combinations and alterations may occur depending on design requirements and other factor in so far as they are within the scope of the appended claims or the equivalents thereof.

What is claimed is:

1. A memory apparatus comprising:
a nonvolatile memory configured to allow data to be written thereto and read therefrom in units of a cluster and to permit data to be deleted therefrom in units of a block made up of a plurality of sectors; and
a control circuit configured to control access operations to said nonvolatile memory;
wherein said nonvolatile memory includes
a management area in which to record management information,
a user data area in which to record data from a user, and
a cache area in which to hold temporarily data to be written and read to and from said user data area; and
said management area includes a logical/physical table which stores the addresses of logical blocks in said user data area in association with the addresses of physical blocks allocated to said logical blocks, and the addresses of physical blocks in said cache area which correspond to the addresses of said physical blocks in said logical/physical table;
wherein,
upon writing of data of which the size is smaller than a designated logical size constituting a logical space size in units of a plurality of sectors in a user block in said user data area, said control circuit saves said data into a suitably selected cache block while writing part of the management information into the cache block which retains said data,
said control circuit determines whether additional data can be written to the selected cache block in view of said management information in the cache block and, if it is found possible to write additional data to said cache block, said control circuit updates said management information in said management area of the nonvolatile memory before writing additional management information to said cache block and adding the write data to said cache block.

2. The memory apparatus according to claim 1, wherein said control circuit saves said data in a plurality of logical spaces in said cache block while maintaining the size in said nonvolatile memory for saving said management information.

3. The memory apparatus according to claim 1, wherein if it is found possible to write said additional data to said cache block, then said control circuit writes additional management information to said cache block before adding the write data to said cache block.

4. The memory apparatus according to claim 3, wherein said control circuit determines whether or not additional data can be written to the selected cache block and, if it is not found possible to write additional data to the cache block, then determines whether or not the number of a plurality of logical spaces registered in said cache block is larger than a predetermined number; and if the number of said plurality of logical spaces is found smaller than said predetermined number, then said control circuit copies effective data saved in said cache block to a new cache block, and adds management information about status following the copy to said new cache block.

5. The memory apparatus according to claim 4, wherein, if there exist a plurality of items of management information in said cache block, then said control circuit makes the most recently written item of management information effective.

6. The memory apparatus according to claim 4, wherein said control circuit writes additional management information to said new cache block before adding the write data thereto.

7. A memory control method for use with a nonvolatile memory configured to allow data to be written thereto and read therefrom in units of a cluster and to permit data to be deleted therefrom in units of a block made up of a plurality of sectors, said nonvolatile memory including a management area adapted to store management information, a user data area and a cache area, said memory control method comprising the steps of:

recording a logical/physical table which stores the addresses of logical blocks in said user data area in association with the addresses of physical blocks allocated to said logical blocks, and the addresses of physical blocks in said cache area which correspond to the addresses of said physical blocks in said logical/physical table;

upon writing of data of which the size is smaller than a designated logical size constituting a logical space size in units of a plurality of sectors in a user block in said user data area, saving said data into a suitably selected cache block while writing part of management information into the cache block which retains said data, and determining whether additional data can be written to the selected cache block in view of said management information in the cache block and, if it is found possible to write additional data to said cache block, updating said management information in said management area of the nonvolatile memory before writing additional management information to said cache block and adding the write data to said cache block.

8. The memory control method according to claim 7, wherein said saving step includes saving said data in a plurality of logical spaces in said cache block while maintaining the size in said nonvolatile memory for saving said management information.

9. The memory control method according to claim 7, wherein if it is found possible to write additional data to said cache block, then writing additional management information to said cache block before adding the write data to said cache block.

10. The memory control method according to claim 9, wherein said saving step includes determining whether or not additional data can be written to the selected cache block and, if it is not found possible to write additional data to the cache block, then determining whether or not the number of a plurality of logical spaces registered in said cache block is larger than a predetermined number; if the number of said plurality of logical spaces is found smaller than said predetermined number, then said saving step includes copying effective data saved in said cache block to a new cache block, and adding management information about status following the copy to said new cache block.

11. The memory control method according to claim 10, wherein, if there exist a plurality of items of management information in said cache block, then said saving step includes making the most recently written item of management information effective.

12. The memory control method according to claim 10, wherein said saving step includes writing additional management information to said new cache block before adding the write data thereto.

13. A non-transitory computer readable medium having stored thereon computer executable instructions for causing a computer to execute a memory control process on a nonvolatile memory configured to allow data to be written thereto and read therefrom in units of a cluster and to permit data to be deleted therefrom in units of a block made up of a plurality of sectors, said nonvolatile memory including a management area adapted to store management information, a user data area and a cache area, said instructions comprising:

recording a logical/physical table which stores the addresses of logical blocks in said user data area in association with the addresses of physical blocks allocated to said logical blocks, and the addresses of physical blocks in said cache area which correspond to the addresses of said physical blocks in said logical/physical table;

upon writing of data of which the size is smaller than a designated logical size constituting a logical space size in units of a plurality of sectors in a user block in said user data area, saving said data into a suitably selected cache block while writing part of management information into the cache block which retains said data, and determining whether additional data can be written to the selected cache block in view of said management information in the cache block and, if it is found possible to write additional data to said cache block, updating said management information in said management area of the nonvolatile memory before writing additional management information to said cache block and adding the write data to said cache block.

* * * * *